(12) United States Patent
Shimizu et al.

(10) Patent No.: US 9,212,289 B2
(45) Date of Patent: Dec. 15, 2015

(54) NON-AQUEOUS PIGMENT INK

(71) Applicant: RISO KAGAKU CORPORATION, Tokyo (JP)

(72) Inventors: Manami Shimizu, Ibaraki-ken (JP); Yoshifumi Watanabe, Ibaraki-ken (JP); Kyoko Tsumura, Ibaraki-ken (JP)

(73) Assignee: RISO KAGAKU CORPORATION, Tokyo (JP)

( * ) Notice: Subject to any disclaimer, the term of this patent is extended or adjusted under 35 U.S.C. 154(b) by 441 days.

(21) Appl. No.: 13/860,803

(22) Filed: Apr. 11, 2013

(65) Prior Publication Data

US 2013/0281572 A1    Oct. 24, 2013

(30) Foreign Application Priority Data

Apr. 18, 2012  (JP) ................................. 2012-094402
Jan. 25, 2013  (JP) ................................. 2013-011690

(51) Int. Cl.
*C09D 11/30* (2014.01)
*C09D 11/326* (2014.01)
*C09D 11/36* (2014.01)

(52) U.S. Cl.
CPC .............. *C09D 11/30* (2013.01); *C09D 11/326* (2013.01); *C09D 11/36* (2013.01)

(58) Field of Classification Search
CPC ....... C09D 11/30; C09D 11/36; C09D 11/326
See application file for complete search history.

(56) References Cited

U.S. PATENT DOCUMENTS

| 2010/0136236 | A1* | 6/2010 | Hosoya et al. | C08G 18/0871 427/261 |
| 2010/0215918 | A1* | 8/2010 | Muller | B29C 51/02 428/195.1 |
| 2011/0046298 | A1* | 2/2011 | Hosoya et al. | C09D 11/36 524/560 |
| 2012/0083567 | A1* | 4/2012 | Hosoya et al. | C09D 7/02 524/516 |

FOREIGN PATENT DOCUMENTS

| CN | 101104759 | 1/2008 |
| CN | 102015924 | 4/2011 |
| JP | 09-151342 | 6/1997 |
| JP | 2008-231364 | 10/2008 |

OTHER PUBLICATIONS

Official Action issued Jan. 7, 2015 in Chinese patent application No. 201310121296.8, 9 pages total.
Official Action issued May 21, 2014 in Chinese patent application No. 201310121296.8, 8 pages total.

* cited by examiner

*Primary Examiner* — Alexander Kollias
(74) *Attorney, Agent, or Firm* — Hamre, Schumann, Mueller & Larson, P.C.

(57) ABSTRACT

A non-aqueous pigment ink is provided, wherein the non-aqueous pigment ink comprises a pigment complex including a pigment, a dispersant comprising a functional group having reactivity with a polyvalent isocyanate compound, and a polyvalent isocyanate compound, and a non-aqueous solvent.

17 Claims, No Drawings

NON-AQUEOUS PIGMENT INK

CROSS REFERENCE TO RELATED APPLICATIONS

This application is based upon and claims the benefit of priority from prior Japanese Patent Applications No. 2012-094402 filed on Apr. 18, 2012 and prior Japanese Patent Applications No. 2013-011690 filed on Jan. 25, 2013, the entire contents of which are incorporated by reference herein.

BACKGROUND OF THE INVENTION

1. Field of the Invention

The present invention relates to a non-aqueous pigment ink.

2. Description of the Related Art

An inkjet recording system is a printing system in which printing is conducted by spraying a liquid ink with a high degree of fluidity from very fine nozzles, and adhering the ink to a recording medium such as a sheet of paper. These systems enable the printing of high-resolution, high-quality images at high speed and with minimal noise, using a comparatively inexpensive printing apparatus, and are rapidly becoming widespread.

Colorants for the inks used in these inkjet recording systems can be broadly classified into those that use pigments and those that use dyes. Of these, there is a growing tendency for the use of inks that use pigments as the colorants, as such inks exhibit the excellent levels of light resistance, weather resistance and water resistance that are required for high image quality printing.

In terms of the solvent, inks can be broadly classified into aqueous inks and non-aqueous inks. In aqueous inks, a water-based solvent or water is used as the ink medium, and therefore it can sometimes be difficult to disperse the pigment finely within this medium, and then ensure favorable stability of the dispersion.

For this reason, Patent Document 1 proposes an aqueous pigment ink in which the pigment is encapsulated to enable dispersion within the aqueous medium.

However, because the ink is aqueous, the problem of poor water resistance remains.

In contrast, non-aqueous inks that do not use water as the ink solvent, including solvent-based inks that use a volatile solvent as the main constituent and oil-based inks that use a non-volatile solvent as the main constituent, are attracting much attention. Compared with aqueous inks, non-aqueous inks exhibit more favorable drying properties and produce minimal curling of the printed paper, and therefore display excellent printability.

These non-aqueous inks contain a non-aqueous solvent, a pigment and a pigment dispersant and the like. Compared with aqueous inks, non-aqueous inks exhibit superior affinity between the colorant and the solvent, and therefore when the ink is adhered to the paper, a problem arises in that the colorant is not retained on the surface of the paper, but rather penetrates into the interior of the paper together with the solvent, causing a reduction in the ink density at the printed surface (upper surface) of the printed item, and the occurrence of show-through on the non-printed surface (rear surface).

For this reason, in order to improve the print density, Patent Document 2 proposes an ink comprising a pigment complex composed of a pigment, a dispersant and an amine compound.

However, in Patent Document 2, the molecular weight of the resin component that coats the pigment is comparatively small, and the fixability of the ink to the recording medium, and in particular the abrasion resistance on smooth papers, is not entirely satisfactory.

[Patent Document 1] JP 09-151342 A
[Patent Document 2] JP 2008-231364 A

An object of the present invention is to provide a non-aqueous pigment ink that exhibits improved fixability of the ink to recording media and low ink viscosity.

SUMMARY OF THE INVENTION

A first aspect of the present invention provides a non-aqueous pigment ink comprising: a pigment complex including a pigment, a dispersant containing a functional group having reactivity with a polyvalent isocyanate compound, and a polyvalent isocyanate compound; and a non-aqueous solvent.

DETAILED DESCRIPTION OF THE EMBODIMENTS

First Embodiment

A non-aqueous pigment ink according to one embodiment of the present invention (hereinafter also referred to as simply "the ink") comprises: a pigment complex including a pigment, a dispersant containing a functional group having reactivity with a polyvalent isocyanate compound, and a polyvalent isocyanate compound; and a non-aqueous solvent. As a result, a non-aqueous pigment ink can be provided that exhibits improved fixability of the ink to recording media and low ink viscosity.

In non-aqueous pigment inks, by adding a high-molecular weight resin, the fixability of the pigment to recording media can be enhanced. For example, by adding a resin having a mass-average molecular weight of fifty thousand to several hundred thousand to the ink, the fixability of the pigment to recording media can be improved. However, the viscosity of the ink increases, and particularly in the case of inkjet inks, a problem may arise in that nozzle blockages become more likely.

On the other hand, in terms of ensuring low ink viscosity, the use of a resin having a mass-average molecular weight of approximately 10,000 to 30,000 as the pigment dispersant is ideal. Particularly in the case of inkjet inks, in order to ensure a viscosity that is appropriate for ink jetting, a low-viscosity ink is desirable. However, when a resin having a mass-average molecular weight of approximately 10,000 to 30,000 is used as a pigment dispersant, because the mass-average molecular weight is comparatively small, satisfactory fixability of the pigment to the recording medium may be unobtainable. This is a particular problem when a paper having superior smoothness is used as the recording medium.

In the present invention, a pigment complex including pigment, a dispersant containing a functional group having reactivity with a polyvalent isocyanate compound, and a polyvalent isocyanate compound is used as the colorant for the non-aqueous pigment ink. This pigment complex is obtained by adsorbing the dispersant to the pigment surface, and performing crosslinking between molecules of the dispersant on the pigment surface using the polyvalent isocyanate compound. As a result, even when the mass-average molecular weight of the dispersant is comparatively small, the fixability of the pigment to recording media can be improved. In particular, the fixability to smooth recording media such as glossy papers can be improved. Further, the ink is also suitable as a low-viscosity inkjet ink.

By adsorbing the dispersant to the pigment surface, and performing crosslinking of the dispersant on the pigment surface using the polyvalent isocyanate compound, the molecular weight of the resin can be increased in the vicinity of the pigment. This existence of a high-molecular weight resin in the vicinity of the pigment facilitates fixation of the pigment to the surface of the recording medium, and enables the fixability of the pigment to be further improved. Further, because the high-molecular weight resin is held in the vicinity of the pigment and does not spread through the entire ink, any increase in the viscosity of the overall ink can be suppressed, meaning a low-viscosity ink can be provided.

In this manner, the present invention enables the fixability of the pigment to the recording medium to be improved, while ensuring a low viscosity for the ink. Furthermore, the ink according to the present invention exhibits excellent pigment dispersibility and good storage stability.

The ink according to the present embodiment comprises the pigment complex including a pigment, a dispersant containing a functional group having reactivity with a polyvalent isocyanate compound, and a polyvalent isocyanate compound. In this pigment complex, the polyvalent isocyanate compound exists in a state in which it acts as a crosslinking agent between molecules of the dispersant, and more specifically, when the dispersant is adsorbed to the pigment, the polyvalent isocyanate compound preferably exists in a state in which it acts as a crosslinking agent between molecules of the dispersant on the pigment surface. The pigment complex comprises the pigment, the dispersant containing a functional group having reactivity with a polyvalent isocyanate compound, and the polyvalent isocyanate compound as the main components, but may also contain other components provided they do not impair the effects of the present invention.

The dispersant and the polyvalent isocyanate compound both include a plurality of reactive sites, and it is preferable that the bonding between the two occurs at two or more sites within each molecule. As a result, it is thought that the resin formed from the dispersant and the polyvalent isocyanate compound at least partially coats the pigment surface. In this manner, in the pigment complex according to the present embodiment, it is preferable that this resin functions as a shell component that at least partially coats the pigment surface, thus forming an encapsulated pigment form, or a form that is close to an encapsulated form.

Examples of the pigment include organic pigments such as azo-based pigments, phthalocyanine-based pigments, dye-based pigments, condensed polycyclic pigments, nitro-based pigments and nitroso-based pigments (such as brilliant carmine 6B, lake red C, Watchung red, disazo yellow, Hansa yellow, phthalocyanine blue, phthalocyanine green, alkali blue and aniline black); inorganic pigments, including metals such as cobalt, iron, chromium, copper, zinc, lead, titanium, vanadium, manganese and nickel, as well as metal oxides and sulfides, and yellow ocher, ultramarine and iron blue pigments; and carbon blacks such as furnace carbon black, lamp black, acetylene black and channel black. Any one of these pigments may be used individually, or a combination of two or more different pigments may be used.

The amount of the pigment within the ink is typically within a range from 0.01 to 20% by mass, and from the viewpoints of the print density and the ink viscosity, is preferably within a range from 1 to 15% by mass, and more preferably from 5 to 10% by mass.

There are no particular limitations on the dispersant, provided it is a dispersant containing a functional group having reactivity with a polyvalent isocyanate compound, and for example, acrylic polymers containing a hydroxyl group, carboxyl group or diketone group or the like as the functional group having reactivity with a polyvalent isocyanate compound can be used. Moreover, in order to prevent the polymer from causing crosslinking between pigment particles, resulting in the formation of an aggregate, the functional group having reactivity with a polyvalent isocyanate compound preferably exhibits good adsorption to the pigment.

One example of a preferred dispersant is a dispersant including a copolymer comprising a unit having an alkyl group of 12 or more carbon atoms, and a unit having a functional group having reactivity with a polyvalent isocyanate compound.

In such a copolymer, the unit having an alkyl group of 12 or more carbon atoms preferably represents 30 to 80 mol %, and more preferably 40 to 60 mol %, of all the units that constitute the copolymer. Examples of the alkyl group of 12 or more carbon atoms include a dodecyl group, hexadecyl group, octadecyl group, docosyl group, isododecyl group and isooctadecyl group, and any one of these groups may be used alone, or a combination of groups may be used.

Furthermore, in the copolymer, the unit having a functional group having reactivity with a polyvalent isocyanate compound preferably represents 20 to 70 mol %, and more preferably 30 to 50 mol %, of all the units that constitute the copolymer. Examples of the functional group having reactivity with a polyvalent isocyanate compound include a hydroxyl group, a carboxyl group and a diketone group, and any one of these groups may be used alone, or a combination of groups may be used.

The copolymer may also include groups other than the alkyl group of 12 or more carbon atoms and the functional group having reactivity with a polyvalent isocyanate compound contained within the aforementioned units. Examples of these other groups include alkyl groups of less than 12 carbon atoms, and a benzyl group.

Another example of a preferred dispersant is a copolymer of a monomer mixture comprising an alkyl (meth)acrylate (A) having an alkyl group of 12 or more carbon atoms (hereafter also referred to as "the monomer (A)") and a reactive (meth)acrylate (B) having a functional group that can react with an amino group (hereafter also referred to as "the monomer (B)") (hereafter this copolymer may be referred to simply as an "acrylic polymer"), wherein the copolymer has a functional group having reactivity with a polyvalent isocyanate compound that has been introduced by a reaction between the functional group that can react with an amino group and an aminoalcohol. In this description, the term "(meth)acrylate" describes either or both of the acrylate and the methacrylate.

In this dispersant, the aminoalcohol portion introduced into the acrylic polymer functions as a pigment adsorption group, and the hydroxyl group within the aminoalcohol reacts with the polyvalent isocyanate compound, and therefore, as described above, formation of a pigment aggregate caused by crosslinking of the polymer can be suppressed.

Examples of the alkyl (meth)acrylate (A) having an alkyl group of 12 or more carbon atoms, and preferably having a long-chain alkyl group of 12 to 25 carbon atoms, include lauryl (meth)acrylate, cetyl (meth)acrylate, stearyl (meth)acrylate, behenyl (meth)acrylate, isolauryl (meth)acrylate and isostearyl (meth)acrylate. The monomer mixture may include a plurality of these compounds.

Examples of preferred groups for the functional group, within the reactive (meth)acrylate (B), that can react with an amino group include a glycidyl group, a vinyl group and a (meth)acryloyl group. An example of the monomer (B) having a glycidyl group is glycidyl (meth)acrylate, and examples of the monomer (B) having a vinyl group include vinyl (meth)acrylate and 2-(2-vinyloxyethoxy)ethyl (meth)acrylate. Examples of the monomer (B) having a (meth)acryloyl group include dipropylene glycol di(meth)acrylate and 1,6-hexanediol di(meth)acrylate. The monomer mixture may include a plurality of these reactive (meth)acrylates (B).

The monomer mixture may also include, in addition to the aforementioned monomers (A) and (B), a monomer (C) that is capable of undergoing copolymerization with the monomers (A) and (B), provided inclusion of the monomer (C) does not impair the effects of the present invention.

Examples of this monomer (C) include styrene-based monomers such as styrene and α-methylstyrene, vinyl acetate, vinyl benzoate, vinyl ether-based monomers such as butyl vinyl ether, maleate esters, fumarate esters, acrylonitrile, methacrylonitrile and α-olefins. Further, alkyl (meth)acrylates in which the alkyl chain length is less than 12 carbon atoms may also be used, including 2-ethylhexyl (meth)acrylate, isooctyl (meth)acrylate and tert-octyl (meth)acrylate. These monomers may be used individually, or in combinations of two or more compounds.

For the monomer (C), the use of a (meth)acrylate having a β-diketone group (—C(=O)—C—C(=O)—) or a β-keto ester group (—C(=O)—C—C(=O)OR, wherein R represents a hydrocarbon group) is preferable. By including this monomer, the viscosity of the ink can be reduced. Accordingly, when selecting the solvent for the ink, there are minimal limitations based on the viscosity of the solvent itself, meaning the selection range for the non-aqueous solvent can be broadened. Further, the permitted range for the increase in ink viscosity caused by the addition of fixing resins or additives, which may be added according to need, can be broadened, meaning the degree of freedom associated with the ink formulation can also be broadened. Moreover, the β-diketone group or β-keto ester group exhibits reactivity with the polyvalent isocyanate compound, and contributes to an improvement in the crosslinking density of the resin on the pigment surface.

Examples of the (meth)acrylate having a β-diketone group or a β-keto ester group include acetoacetoxyalkyl (meth)acrylates such as 2-acetoacetoxyethyl (meth)acrylate, hexadione (meth)acrylate, and acetoacetoxyalkyl (meth)acrylamides such as acetoacetoxyethyl (meth)acrylamide. These monomers may be used individually, or in combinations of two or more compounds.

The amount of the alkyl (meth)acrylate (A) in the above monomer mixture is preferably at least 30% by mass, more preferably within a range from 40 to 95% by mass, and most preferably from 50 to 90% by mass.

The amount of the reactive (meth)acrylate (B) is preferably within a range from 1 to 30% by mass, and more preferably from 3 to 25% by mass.

The monomer (C) other than the monomers (A) and (B) is preferably included in an amount of 60% by mass or less, and preferably 10 to 40% by mass.

When synthesizing the dispersant, first the aforementioned monomers (A) and (B) and the optional monomer (C) are copolymerized to form an acrylic polymer, and this acrylic polymer is then reacted with diethanolamine to obtain an amine-modified acrylic polymer, thus completing synthesis of the dispersant.

The aforementioned monomers (A) and (B) and the optional monomer (C) can be copolymerized easily by conventional radical copolymerization. The reaction is preferably conducted as either a solution polymerization or a dispersion polymerization. If necessary, the polymerization reaction can be accelerated by performing the polymerization reaction under heat. The heating temperature is typically controlled appropriately within a range from 40 to 130° C., and preferably from 80 to 130° C.

In this case, in order to ensure that the molecular weight of the acrylic polymer following polymerization satisfies the preferred range described below, the use of a chain transfer agent during polymerization is effective. Examples of compounds that can be used as this chain transfer agent include thiols such as n-butyl mercaptan, lauryl mercaptan, stearyl mercaptan and cyclohexyl mercaptan.

Examples of polymerization initiators that may be used include conventional thermal polymerization initiators, including azo compounds such as AIBN (azobisisobutyronitrile), and peroxides such as t-butyl peroxybenzoate and t-butylperoxy-2-ethylhexanoate (Perbutyl O, manufactured by NOF Corporation). Alternatively, a photopolymerization initiator may be used in which irradiation with an active energy beam is used to generate radicals.

Petroleum-based solvents (such as aroma-free (AF) solvents) and the like can be used as the polymerization solvent used in a solution polymerization. This polymerization solvent is preferably one or more solvents selected from among those solvents (described below) that can be used, as is, for the non-aqueous solvent within the ink. Further, from the viewpoint of monomer solubility, an organic solvent such as hexane, chloroform, dichloromethane, pentane, pyridine, diethyl ether, acetone, methanol, ethanol, propanol, butanol, benzene, ethyl acetate, methyl ethyl ketone, 1,4-dioxane, N,N-dimethylformamide, dimethylsulfoxide, toluene or tetrahydrofuran may also be added. These organic solvents can be removed following the polymerization.

During the polymerization reaction, other typically employed polymerization inhibitors, polymerization accelerators and dispersants and the like may also be added to the reaction system.

Next, by using a reaction between the functional group that can react with an amino group and an aminoalcohol, a functional group having reactivity with a polyvalent isocyanate compound is introduced into the obtained copolymer (acrylic polymer), thereby synthesizing an amine-modified acrylic polymer and obtaining the dispersant. The amino group of the aminoalcohol reacts with and bonds to the functional group that can react with an amino group in the monomer (B). In order to accelerate the reaction, the reaction may be performed under heating within a temperature range of 70 to 120° C.

Examples of the aminoalcohol include monomethylethanolamine, diethanolamine and diisopropanolamine. Of these, dialkanolamines (secondary alkanolamines) represented by a general formula (HOR)$_2$NH (wherein R represents a divalent hydrocarbon group) are preferable, as they provide two hydroxyl groups, thereby increasing the number of reactive sites. A combination of a plurality of these aminoalcohols may also be used.

In order to generate sufficient sites for reaction with the polyvalent isocyanate compound, and also to ensure satisfactory pigment dispersion, the aminoalcohol is preferably reacted in an amount of 0.05 to 1 molar equivalent, and more preferably 0.5 to 1 molar equivalent, relative to the functional group that can react with an amino group in the monomer (B). When the amount of the aminoalcohol is less than 1 molar equivalent, unreacted functional groups will remain within the monomer (B), but it is thought that these residual functional groups function as pigment adsorption groups.

The polyvalent isocyanate compound is a compound having two or more isocyanate groups, and may be an aliphatic polyisocyanate, an alicyclic polyisocyanate or an aromatic polyisocyanate. Specific examples include diisocyanates such as 1,6-diisocyanatohexane, 1,3-bis(isocyanatomethyl)benzene, 1,3-bis(isocyanatomethyl)cyclohexane, 1,5-naphthalene diisocyanate, diphenylmethane-4,4-diisocyanate and hexamethylene diisocyanate, triisocyanates such as 1-methylbenzene-2,4,6-triyltriisocyanate and 1,6,11-triisocyanatoundecane, and polyisocyanates such as polymethylene polyphenyl polyisocyanate.

Further, examples of compounds having 3 or more isocyanate groups that can be used as the polyvalent isocyanate compound include polyvalent isocyanate compounds comprising an isocyanurate ring, polyvalent isocyanate compounds comprising an adduct structure, polyvalent isocyanate compounds comprising a biuret structure and polyvalent isocyanate compounds comprising an uretdione structure. In these polyvalent isocyanate compounds, the proportion of the unit containing an isocyanate group (NCO) within the overall polyvalent isocyanate compound is preferably within a range from 5 to 50% by mass.

Examples of the polyvalent isocyanate compound comprising an isocyanurate ring include hexamethylene diisocyanate isocyanurate and 3-isocyanatomethyl-3,5,5-trimethylcyclohexyl isocyanate isocyanurate. Further, an example of the polyvalent isocyanate compound comprising an adduct structure is hexamethylene diisocyanate comprising an adduct structure. Polyvalent isocyanate compounds comprising an isocyanurate ring are particularly preferable, and of such compounds, hexamethylene diisocyanate isocyanurate is particularly desirable.

The above polyvalent isocyanate compounds may be used individually, or in combinations of two or more compounds.

In order to ensure that no unreacted raw materials remain when the polyvalent isocyanate compound is reacted with the functional group, which exists within the dispersant, having reactivity with the polyvalent isocyanate compound, such as the hydroxyl group or carboxyl group, the polyvalent isocyanate compound is preferably reacted in an amount that is substantially equimolar with (within a range from 0.98 to 1.02 molar equivalents relative to) the total of all the functional groups having reactivity with the polyvalent isocyanate compound contained within the added raw materials.

Moreover, it is particularly desirable that the polyvalent isocyanate compound is reacted in an amount of at least 0.60 equivalents relative to the functional groups having reactivity with the polyvalent isocyanate compound. In the case of compounds having three or more isocyanate groups, and particularly in the case of compounds comprising an isocyanurate ring, by reacting the polyvalent isocyanate compound in an amount of at least 0.30 equivalents relative to the functional groups having reactivity with the polyvalent isocyanate compound, the fixability of the ink can be improved.

In one example of a method of producing the pigment complex, the dispersant is first adsorbed to the pigment by mixing the pigment and the dispersant to prepare a pigment dispersion, and this pigment dispersion is then reacted with the polyvalent isocyanate compound to effect crosslinking between molecules of the dispersant adsorbed to the pigment surface, thus forming the pigment complex.

In the process for producing the pigment complex, by using the non-aqueous solvent for the ink described below as the solvent, and adding the optional components for the ink described below, the ink itself can be obtained. If desired, the thus obtained ink may be filtered using a membrane filter or the like.

Specifically, first, pigment dispersion is performed by adding the pigment and the dispersant including the amine-modified acrylic polymer to a solvent, thus obtaining a pigment dispersion. Dispersion of the pigment can be performed, for example, by adding the pigment, the dispersant and the solvent to an arbitrary dispersion device such as a beads mill, and then stirring and mixing the components.

Next, the pigment dispersion and the polyvalent isocyanate compound are added to a solvent and reacted, thus obtaining the pigment complex. For example, a mixture of the polyvalent isocyanate compound and a solvent may be added dropwise to the mixture of the pigment dispersion and the solvent to effect reaction. At this time, heating within a temperature range from 70 to 120° C. may be performed to accelerate the reaction. Further, a catalyst such as dibutyltin dilaurate may also be added to the reaction system.

In the above reaction, the isocyanate ester group (R1N=C=O) of the polyvalent isocyanate compound undergoes an addition reaction to the hydroxyl group derived from the aminoalcohol within the amine-modified acrylic polymer adsorbed to the pigment surface, yielding a urethane linkage (carbamate ester: R1NHCOOR).

$$R1N=C=O+R-OH \rightarrow ROCONHR1$$

R— represents the portion of the aminoalcohol bonded to a functional group of the acrylic polymer.

The above reaction occurs continuously, so that molecules of the amine-modified acrylic polymer on the pigment surface form a crosslinked structure with the polyvalent isocyanate compound, thus forming a state where the resin covers the pigment surface.

In this manner, by using, as the reaction site, the aminoalcohol bonded to the monomer (B) of the amine-modified acrylic polymer that functions as the pigment dispersant, and forming a urethane linkage with the polyvalent isocyanate compound, molecules of the dispersant on the pigment surface undergo crosslinking, enabling formation of a pigment complex in which the pigment is covered with a resin.

In the above reaction, it is also preferable that a polyhydric alcohol is added in combination with the polyvalent isocyanate compound, and the polyhydric alcohol and the polyvalent isocyanate compound are reacted. By adding a polyhydric alcohol, formation of the urethane linkages can be repeated, thereby promoting formation of the crosslinked structure, and forming a stronger resin layer around the periphery of the pigment.

Examples of the polyhydric alcohol include ethylene glycol, propylene glycol, dipropylene glycol, 1,3-propanediol, polyethylene glycol and polypropylene glycol, and a combination of a plurality of these compounds may also be used.

The polyhydric alcohol is also important for controlling the amount of resin on the pigment surface, and including a large amount of the polyhydric alcohol increases the amount of resin on the pigment surface, but if the amount is too large, then crosslinking starts to occur between pigment particles, which can cause gelling of the ink, and is therefore undesirable. On the other hand, if the amount of the polyhydric alcohol is too small, then the effect of the polyhydric alcohol in increasing the amount of resin on the pigment surface is not realized satisfactorily, and the fixability action obtained by adding the polyhydric alcohol may not manifest adequately. Accordingly, the polyhydric alcohol is preferably reacted in an amount of 0.1 to 10 molar equivalents relative to the aminoalcohol, and this amount is more preferably from 0.1 to 2.0 molar equivalents, and still more preferably from 0.25 to 1.0 molar equivalents.

Although there are no particular limitations on the molecular weight (mass-average molecular weight) of the amine-modified acrylic polymer that constitutes the dispersant, if the ink is to be used as an inkjet ink, then from the viewpoint of ink dischargeability, the molecular weight is preferably within a range from approximately 10,000 to 100,000, and more preferably from approximately 10,000 to 80,000. Moreover, in the case of the dispersant of the present embodiment, superior fixability can be achieved when the molecular weight is approximately 20,000 to 50,000.

The molecular weight of this amine-modified acrylic polymer is substantially the same as the acrylic copolymer of the above monomer mixture, and therefore by controlling the molecular weight in the polymerization process for the acrylic copolymer, an amine-modified acrylic polymer having a molecular weight within the desired range can be obtained.

In the dispersant, the reactive sites for reaction with the polyvalent isocyanate compound are represented by the total amount (number) of functional groups having reactivity with a polyvalent isocyanate compound within the amine-modified acrylic polymer that constitutes the dispersant. Examples of these functional groups having reactivity with a polyvalent isocyanate compound include the OH group introduced via the aminoalcohol that is introduced via reaction with the functional group that can react with an amino group in the monomer (B), and the β-diketone group or β-keto ester group contained in the monomer (C).

If the number of reactive sites in the dispersant for reaction with the polyvalent isocyanate compound is excessive, then the amount of introduced polyvalent isocyanate compound becomes too great, which can cause an increase in the ink viscosity or a deterioration in the dispersion stability, whereas if the number of reactive sites is too few, then the amount of introduced polyvalent isocyanate compound is too small, and the desired fixability effect may not be adequately realized. These effects are also affected by the molecular weight of the dispersant. In the dispersant, the molar ratio between the monomers (B) and (C) which include reactive sites, and the monomer (A) that does not include a reactive site, is preferably within a range from 20:80 to 70:30, and is more preferably from 40:60 to 60:40.

In the pigment complex, from the viewpoint of pigment dispersibility, the ratio of the total amount of the polymer component, including the dispersant and the polyvalent isocyanate compound, relative to the pigment is preferably a mass ratio within a range from 0.05 to 2.0, and more preferably from 0.4 to 1.5, relative to a value of 1 for the pigment.

In the pigment complex, the proportion of the polyvalent isocyanate compound relative to the total mass of the polymer component including the dispersant and the polyvalent isocyanate compound is preferably within a range from 10 to 50% by mass, and more preferably from 20 to 45% by mass.

In the pigment complex, the mass ratio of the polyvalent isocyanate compound relative to a value of 1 for the pigment is preferably from 0.05 to 1.0, and more preferably from 0.1 to 0.6.

By adding the polyvalent isocyanate compound to the pigment complex, the dispersant is able to form a crosslinked structure on the pigment surface, thereby yielding excellent fixability. On the other hand, if the amount of the polyvalent isocyanate compound is excessive, then crosslinking also occurs away from the pigment surface, and may result in crosslinking between pigment particles, which can cause an increase in the ink viscosity, and therefore it is preferable that the amount added of the polyvalent isocyanate compound is controlled within the above range.

The average particle size of the pigment complex is preferably not more than approximately 300 nm, more preferably 200 nm or less, and still more preferably 150 nm or less. On the other hand, in order to suppress show-through on the printed item, the average particle size is preferably at least approximately 50 nm. In this description, the average particle size of the pigment complex can be measured, for example, using a dynamic light-scattering particle size distribution measurement apparatus LB-500 manufactured by Horiba, Ltd.

The ink according to the present embodiment may also include another pigment dispersant in combination with the pigment complex described above, provided this other pigment dispersant does not impair the effects of the present invention. There are no particular limitations on this pigment dispersant, and any dispersant that enables the pigment to be dispersed stably within the solvent may be used. Examples include hydroxyl group-containing carboxylate esters, salts of long-chain polyaminoamides and high-molecular weight acid esters, salts of high-molecular weight polycarboxylic acids, salts of long-chain polyaminoamides and polar acid esters, high-molecular weight unsaturated acid esters, high-molecular weight copolymers, modified polyurethanes, modified polyacrylates, polyether ester anionic surfactants, naphthalenesulfonic acid-formalin condensate salts, polyoxyethylene alkyl phosphate esters, polyoxyethylene nonyl phenyl ethers, polyester polyamines, and stearyl amine acetate. Among these, the use of a high-molecular weight dispersant is preferable. These dispersants may be used individually, or in combinations of two or more compounds.

The ink according to the present embodiment comprises a non-aqueous solvent. Here, the term "non-aqueous solvent" refers to non-polar organic solvents and polar organic solvents for which the 50% distillation point is at least 100° C. The "50% distillation point" is measured in accordance with JIS K0066 "Test Methods for Distillation of Chemical Products" and refers to the temperature at which 50% by mass of the solvent is evaporated.

For example, examples of preferred non-polar organic solvents include aliphatic hydrocarbon solvents, alicyclic hydrocarbon solvents and aromatic hydrocarbon solvents. Specific examples of preferred aliphatic hydrocarbon solvents and alicyclic hydrocarbon solvents include Teclean N-16, Teclean N-20, Teclean N-22, Nisseki Naphtesol L, Nisseki Naphtesol M, Nisseki Naphtesol H, No. 0 Solvent L, No. 0 Solvent M, No. 0 Solvent H, Nisseki Isosol 300, Nisseki Isosol 400, AF-4, AF-5, AF-6 and AF-7, all manufactured by JX Nippon Oil & Energy Corporation; and Isopar E, Isopar G, Isopar H, Isopar L, Isopar M, Exxsol DSP 100/140, Exxsol D30, Exxsol D40, Exxsol D80, Exxsol D100, Exxsol D130 and Exxsol D140, all manufactured by Exxon Mobil Corporation. Specific examples of preferred aromatic hydrocarbon solvents include Nisseki Cleansol G (alkylbenzene) manufactured by JX Nippon Oil & Energy Corporation, and Solvesso 200 manufactured by Exxon Mobil Corporation.

Examples of solvents that can be used as the polar organic solvent include ester-based solvents, alcohol-based solvents, higher fatty acid-based solvents, ether-based solvents, and mixtures thereof. Examples of preferred polar organic solvents include one or more solvents selected from the group consisting of ester-based solvents that are esters of a higher fatty acid of 8 to 20 carbon atoms and an alcohol of 1 to 24 carbon atoms, higher alcohols of 8 to 24 carbon atoms, and higher fatty acids of 8 to 20 carbon atoms.

More specific examples of polar organic solvents that can be used favorably include ester-based solvents such as methyl laurate, isopropyl laurate, isopropyl myristate, isopropyl palmitate, isostearyl palmitate, isooctyl palmitate, methyl oleate, ethyl oleate, isopropyl oleate, butyl oleate, methyl linoleate, isobutyl linoleate, ethyl linoleate, isopropyl isostearate, methyl soybean oil, isobutyl soybean oil, methyl tallate, isobutyl tallate, diisopropyl adipate, diisopropyl sebacate, diethyl sebacate, propylene glycol monocaprate, trimethylolpropane tri-2-ethylhexanoate and glyceryl tri-2-ethylhexanoate; alcohol-based solvents such as isomyristyl alcohol, isopalmityl alcohol, isostearyl alcohol, oleyl alcohol, hexyldecanol, octyldodecanol and decyltetradecanol; higher fatty acid-based solvents such as nonanoic acid, isononanoic acid, isomyristic acid, hexadecanoic acid, isopalmitic acid, oleic acid and isostearic acid; and ether-based solvents such as diethylene glycol monobutyl ether, ethylene glycol monobutyl ether, propylene glycol monobutyl ether and propylene glycol dibutyl ether.

In addition to the components described above, the ink may also include any of the various additives typically used in the field, provided inclusion of these additives does not impair the effects of the present invention.

The ink according to the present embodiment may contain other arbitrary components in amounts that do not impair the effects of the present invention. For example, suitable amounts of resins other than the dispersant described above, nozzle blockage prevention agents, antioxidants, conductivity modifiers, viscosity modifiers, surface tension modifiers and oxygen absorbers and the like may be added. There are no particular limitations on the nature of these additives, and the types of materials typically used within the technical field can be used.

The ideal range for the viscosity of the ink varies depending on factors such as the diameter of the discharge head nozzles in the inkjet recording system and the discharge environment, but generally, at 23° C., the viscosity is preferably within a range from 5 to 30 mPa·s, more preferably from 5 to 15 mPa·s, still more preferably 13 mPa·s or less, and most preferably 9 mPa·s or less. Here, the viscosity is measured at 23° C. by raising the shear stress from 0 Pa at a rate of 0.1 Pals, and refers to the measured value at 10 Pa.

Although there are no particular limitations on the printing method that uses the ink according to the present embodiment, conducting printing using an inkjet recording apparatus is preferred. The inkjet printer may employ any of various printing systems, including a piezo system, electrostatic system or thermal system. In those cases where an inkjet recording apparatus is used, the ink according to the present embodiment is preferably discharged from the inkjet head based on a digital signal, with the discharged ink droplets being adhered to a recording medium.

According to the present invention, a non-aqueous pigment ink that exhibits improved fixability of the ink to recording media and low ink viscosity.

<Pigment Complex>

The method of producing the pigment complex according to the present embodiment comprises a step of adsorbing a dispersant to a pigment, and a step of performing crosslinking between molecules of the dispersant using a polyvalent isocyanate compound, wherein the dispersant is a copolymer of a monomer mixture comprising an alkyl (meth)acrylate (A) having an alkyl group of 12 or more carbon atoms, and a reactive (meth)acrylate (B) having a functional group that can react with an amino group, and the copolymer has a functional group having reactivity with a polyvalent isocyanate compound that has been introduced by a reaction between the functional group that can react with an amino group and an aminoalcohol. By employing this method, a pigment complex can be provided that can improve the fixability of the ink to recording media, and keep the viscosity of the ink low.

In this method, the dispersant corresponds with the aforementioned amine-modified acrylic polymer, and the alkyl (meth)acrylate (A) and the reactive (meth)acrylate (B) correspond with the aforementioned monomer (A) and monomer (B) respectively.

Second Embodiment

In a non-aqueous ink according to one embodiment of the present invention, one example of a preferred dispersant that can be used is a block copolymer having a first block comprising a unit having an alkyl group of 12 or more carbon atoms, and a second block comprising a unit having a functional group having reactivity with a polyvalent isocyanate compound, wherein relative to all of the units that constitute the first block, the amount of the unit having an alkyl group of 12 or more carbon atoms is at least 50 mol % and the amount of the unit having a functional group having reactivity with a polyvalent isocyanate compound is less than 10 mol %, whereas relative to all of the units that constitute the second block, the amount of the unit having a functional group having reactivity with a polyvalent isocyanate compound is at least 10 mol % (hereafter this dispersant may be referred to as a "block polymer dispersant").

This block polymer dispersant can be used to prepare a pigment complex in combination with the pigment and the polyvalent isocyanate compound described above, and can be used to prepare a non-aqueous pigment ink in combination with the non-aqueous solvent and the like included within the ink described above. Unless specifically stated otherwise, the pigment complex that uses the block polymer dispersant (hereafter also referred to as a "block pigment complex") and the non-aqueous pigment ink that uses the block polymer dispersant may include the same components as those described above in similar proportions, and the physical properties are also similar.

In the same manner as that described above for the dispersant synthesized by batch radical polymerization of the monomer components described above (hereafter this dispersant is also referred to as a "random polymer dispersant"), the block polymer dispersant is also able to provide a non-aqueous pigment ink that exhibits improved fixability of the ink to recording media and low ink viscosity. By using the block polymer dispersant, even better dispersion stability can be achieved within non-aqueous solvents, and particularly non-polar solvents. Further, the ink viscosity can be lowered even further.

In the block pigment complex, this block polymer dispersant exists in a cross-linked state in which molecules of the dispersant on the pigment surface have undergone crosslinking via the polyvalent isocyanate compound.

Because the polyvalent isocyanate compound and the block polymer dispersant both include a plurality of reactive sites, it is thought that bonding between the two can occur at two or more sites on each molecule, so that the crosslinked polymer at least partially coats the surface of the pigment to which the block polymer dispersant is adsorbed.

In other words, it is thought that this crosslinked polymer functions at least partially as a shell component, forming an encapsulated pigment form, or a form that is close to an encapsulated form. This represents a preferred form for the pigment complex of the present embodiment.

In the random polymer dispersant described above, the functional group having reactivity with a polyvalent isocyanate compound is scattered randomly throughout the polymer.

In contrast, in the block polymer dispersant, because the functional group having reactivity with a polyvalent isocyanate compound is concentrated within the second block portion, the first block portion can be more easily oriented with the solvent direction via the action of the alkyl group of 12 or more carbon atoms. As a result, the solubility within the solvent can be improved. This effect is particularly pronounced for solvents of low polarity such as non-polar solvents, and means that more favorable pigment dispersion and storage stability can be achieved.

The molar ratio between the first block and the second block is preferably within a range from 20:80 to 90:10, and more preferably from 30:70 to 70:30.

The block polymer dispersant may be a block copolymer in which a single first block is bonded to a single second block, or may be a block copolymer in which a plurality of each of the first and second blocks are bonded in an alternating arrangement.

Relative to all of the units that constitute the first block, the amount of the unit having an alkyl group of 12 or more carbon atoms is at least 50 mol %, and is preferably at least 55 mol %, and more preferably 60 mol % or more.

Relative to all of the units that constitute the first block, the amount of the unit having a functional group having reactivity with a polyvalent isocyanate compound is typically less than 10 mol %, and is preferably 5 mol % or less, more preferably 1 mol % or less, and still more preferably substantially zero. This enables the solvent affinity of the first block to be improved.

Relative to all of the units that constitute the second block, the amount of the unit having a functional group having reactivity with a polyvalent isocyanate compound is at least 10 mol %, and is preferably at least 20 mol %, and more preferably 30 mol % or greater. On the other hand, relative to all of the units that constitute the second block, the amount of the unit having a functional group having reactivity with a polyvalent isocyanate compound is preferably not more than 95 mol %, and more preferably 70 mol % or less.

Relative to all of the units that constitute the second block, the amount of the unit having an alkyl group of 12 or more carbon atoms is preferably within a range from 10 to 90 mol %, more preferably from 20 to 80 mol %, and still more preferably from 30 to 70 mol %. The second block need not necessarily contain a unit having an alkyl group of 12 or more carbon atoms.

Both the first and second blocks may also include other groups besides the alkyl group of 12 or more carbon atoms and the functional group having reactivity with a polyvalent isocyanate compound respectively. Examples of these other groups include alkyl groups of less than 12 carbon atoms and a benzyl group.

A block acrylic polymer comprising a functional group having reactivity with a polyvalent isocyanate compound, such as a hydroxyl group, carboxyl group or diketone group, can be used as the block polymer dispersant. Moreover, in order to prevent polymer crosslinking between pigment particles, resulting in the formation of aggregates, the functional group having reactivity with a polyvalent isocyanate compound preferably exhibits favorable adsorption to the pigment.

One example of a preferred block polymer dispersant is a block copolymer comprising a block A formed from a monomer mixture a comprising an alkyl (meth)acrylate (A) having an alkyl group of 12 or more carbon atoms (hereafter also referred to as "the monomer (A)"), and a block B formed from a monomer mixture b comprising a reactive (meth)acrylate (B) having a functional group that can react with an amino group (hereafter also referred to as "the monomer (B)") (hereafter this block copolymer may also be referred to as simply a "block acrylic polymer"), wherein the block copolymer has a functional group having reactivity with a polyvalent isocyanate compound that has been introduced by a reaction between the functional group that can react with an amino group and an aminoalcohol.

In this block polymer dispersant, because the aminoalcohol portion introduced into the acrylic polymer functions as a pigment adsorption group, and the hydroxyl group within the aminoalcohol reacts with the polyvalent isocyanate compound, as described above, formation of a pigment aggregate caused by crosslinking of the polymer can be suppressed.

In the case of a random polymer dispersant, because polymerization is performed with the monomer (B) scattered randomly, the functional group having reactivity with a polyvalent isocyanate compound, which is introduced using the reaction with the functional group of the monomer (B), is scattered randomly through the copolymer of the monomer mixture comprising the monomer (A) an the monomer (B).

In contrast, in the case of a block polymer dispersant, the block copolymer is prepared with the monomer (B) concentrated within the block B portion, and therefore the functional group having reactivity with a polyvalent isocyanate compound, which is introduced using the reaction with the functional group of the monomer (B), is concentrated within the block B portion of the block copolymer.

As described above, this functional group exhibits comparatively good adsorption to the pigment, and therefore by partially concentrating this functional group, the adsorption of the block polymer dispersant to the pigment can be enhanced compared with that of a random polymer dispersant, enabling the crosslinking by the polyvalent isocyanate compound to be concentrated in portions closer to the pigment surface. As a result, compared with the case of a random polymer dispersant, the block polymer dispersant is able to generate a stronger coating of the pigment by the crosslinked polymer. This type of block pigment complex exhibits particularly superior fixability to recording media.

Further, with the block polymer dispersant, by enhancing the strength of the coating formed by the crosslinked polymer on the pigment, the resin component can be accumulated in portions closer to the pigment surface than that achievable using a random polymer dispersant, and therefore any increase in the viscosity of the ink can be suppressed.

Furthermore, in the block polymer dispersant, by concentrating the functional group having reactivity with a polyvalent isocyanate compound within the block B portion, the block B is oriented on the side of the pigment, whereas the block A is oriented on the side of the solvent, and as a result, compared with the case where a random polymer dispersant is used, other pigment particles can be prevented from approaching, enabling the crosslinking of pigment particles and pigment aggregation to be prevented. As a result, the dispersibility can be improved.

The molar ratio between the block A and the block B is preferably within a range from 20:80 to 90:10, and is more preferably from 30:70 to 70:30.

One example of the block polymer dispersant is an A-B block copolymer in which a block A comprising mainly units based on the monomer (A), and a block B comprising mainly units based on the monomer (B) are bonded in an A-B type arrangement.

Furthermore, from the viewpoints of the compatibility between the dispersant and the solvent, and the adsorption to the pigment, the block polymer dispersant may also be an A-AB block copolymer in which a block A comprising mainly units based on the monomer (A), and a block AB having both units based on the monomer (B) and units based on the monomer (A) are bonded in an A-AB type arrangement, or an A-B-A block copolymer in which a block A comprising mainly units based on the monomer (A), and a block B comprising mainly units based on the monomer (B) are bonded in an A-B-A type arrangement. There are no particular limitations on the number of connected blocks.

From the viewpoint of the solubility in non-aqueous solvents, and particularly the solubility in non-polar solvents, an A-AB block copolymer or an A-B-A block copolymer is preferable.

The same compounds as those mentioned above can be used as the alkyl (meth)acrylate having an alkyl group of 12 or more carbon atoms, and the number of carbon atoms in the alkyl group is preferably from 12 to 25.

The same functional groups as those mentioned above can be used as the functional group that can react with an amino group within the reactive (meth)acrylate (B). Further, the same compounds as those mentioned above can be used as the reactive (meth)acrylate (B).

The monomer mixtures a and b may also include, in addition to the aforementioned monomers (A) and (B), a monomer (C) that is capable of undergoing copolymerization with these monomers (A) and (B), provided inclusion of the monomer (C) does not impair the effects of the present invention.

The compounds mentioned above can be used as the monomer (C). Further, in a similar manner to that described above, a (meth)acrylate having a β-diketone group (—C(=O)—C—C(=O)—) or a β-keto ester group (—C(=O)—C—C(=O)OR, wherein R represents a hydrocarbon group) can be used as the monomer (C). The β-diketone group or β-keto ester group functions as a functional group that exhibits reactivity with the polyvalent isocyanate compound, and can therefore be added favorably to the monomer mixture b, whereas the amount added to the monomer mixture a is preferably limited.

From the viewpoints of achieving good affinity with the solvent used and regulating the molecular weight, an alkyl (meth)acrylate having an alkyl chain length of less than 12 carbon atoms can be used particularly favorably as the monomer (C).

In the above monomer mixture a, the amount of the alkyl (meth)acrylate (A) is preferably at least 30% by mass, more preferably within a range from 40 to 95% by mass, and most preferably from 50 to 90% by mass.

The monomer mixture a preferably does not contain the reactive (meth)acrylate (B), and the amount of the reactive (meth)acrylate (B) is typically less than 10% by mass, preferably 5% by mass or less, and more preferably 1% by mass or less.

In the monomer mixture a, the monomer (C) other than the monomers (A) and (B) is preferably included in an amount of not more than 60% by mass, and this amount is more preferably within a range from 10 to 40% by mass. Further, within the monomer (C), the amount of compounds having a functional group having reactivity with a polyvalent isocyanate compound, such as a hydroxyl group, carboxyl group or diketone group, is preferably less than 10% by mass, more preferably 5% by mass or less, and still more preferably 1% by mass or less.

In the above monomer mixture b, the amount of the reactive (meth)acrylate (B) is preferably at least 10% by mass, more preferably within a range from 15 to 50% by mass, and still more preferably from 20 to 40% by mass.

Further, from the viewpoints of achieving good affinity with the solvent used and regulating the molecular weight, the monomer mixture b preferably also includes the monomer (A). The monomer mixture b preferably includes 5 to 80% by mass, and more preferably 10 to 50% by mass, of the monomer (A).

The monomer mixture b may favorably include an alkyl (meth)acrylate having less than 12 carbon atoms as the monomer (C) other than the monomers (A) and (B), and in this case, the amount of the alkyl (meth)acrylate having less than 12 carbon atoms is preferably not more than 60% by mass, and more preferably 10 to 40% by mass.

In one example of a method of synthesizing the block polymer dispersant, first, in a first stage, one of the monomer mixture a comprising the monomer (A) and the monomer mixture b comprising the monomer (B) is polymerized to obtain one block, and in a second stage, the other monomer mixture is then polymerized in the presence of this first block, thus obtaining a block acrylic polymer in which polymerized blocks of the other block are bonded to the terminals of the first block, and subsequently, this block acrylic polymer is reacted with diethanolamine to obtain an amine-modified block acrylic polymer, thus completing synthesis of the block polymer dispersant.

Below is a description of a method of synthesizing the block acrylic polymer in which the monomer mixture a comprising the monomer (A) is polymerized in the first stage to obtain a block A, and the monomer mixture b comprising the monomer (B) is added in the second stage, thereby polymerizing a block B from the terminal portion of the block A to synthesize the block acrylic polymer. Depending on the variety of the monomers used, it may also be possible to polymerize the block B first, and then polymerize the block A.

First, in the first stage, the monomer mixture a may also include, in addition to the monomer (A), an optional monomer (C) other than the monomers (A) and (B), provided inclusion of the monomer (C) does not impair the effects of the present invention. The compounds mentioned above can be used as the monomer (C). Of the various possibilities for the monomer (C), the use of an alkyl (meth)acrylate having less than 12 carbon atoms is preferable.

This monomer mixture a can be polymerized by conventional radical polymerization. The reaction is preferably conducted as either a solution polymerization or a dispersion polymerization. If necessary, the polymerization reaction can be accelerated by performing the polymerization reaction under heat. The heating temperature is typically controlled appropriately within a range from 40 to 130° C., and preferably from 80 to 130° C.

During the polymerization reaction, in a similar manner to that described for the aforementioned random polymer dispersant, chain transfer agents, polymerization initiators, polymerization inhibitors, polymerization accelerators and dispersants and the like may also be added to the reaction system.

There are no particular limitations on the polymerization solvent used during solution polymerization, and a typical organic solvent or high-boiling point can be used. For example, petroleum-based solvents (such as aroma-free (AF) solvents) and the like can be used as the high-boiling point solvent. This polymerization solvent is preferably one or more solvents selected from among those solvents (described below) that can be used, as is, for the non-aqueous solvent within the ink. Further, from the viewpoint of monomer solubility, an organic solvent such as hexane, chloroform, dichloromethane, pentane, pyridine, diethyl ether, acetone, methanol, ethanol, propanol, butanol, benzene, ethyl acetate, methyl ethyl ketone, 1,4-dioxane, N,N-dimethylformamide, dimethylsulfoxide, toluene or tetrahydrofuran may also be added. These organic solvents can be removed following the polymerization.

Next, in the second stage, the monomer mixture b may include the monomer (A) in addition to the monomer (B), and may also include a monomer (C), provided inclusion of the monomer (C) does not impair the effects of the present invention. The monomer (C) is as described above. Of the various possibilities for the monomer (C), the use of an alkyl (meth) acrylate having less than 12 carbon atoms or a compound having a β-diketone group and/or β-keto ester group is preferable.

By polymerizing the monomer mixture b in the presence of the block A synthesized in the manner described above, the monomer B can be bonded to the terminal of the block A, thus forming a block copolymer. The polymerization conditions and the use of additives and the like are the same as described above for the block A polymerization.

In the present embodiment, the block polymer dispersant is preferably polymerized by a living polymerization method, which is a type of precision polymerization. In the example described above, by performing a living polymerization of the monomer mixture b comprising the monomer (B) together with the synthesized block A, a block polymer can be produced. The block B may also be polymerized first, and the monomer mixture a comprising the monomer (A) then subjected to living polymerization.

In order to obtain the block polymer dispersant, in the present embodiment, a living radical polymerization is preferably used as the living polymerization method. Examples of known living radical polymerization methods include atom transfer radical polymerization (ATRP), nitroxide-mediated radical polymerization (NMP) and reversible addition fragmentation chain transfer polymerization (RAFT polymerization), and although any of these methods may be used, performing the polymerization by RAFT polymerization is particularly desirable.

RAFT polymerization is characterized by the use of a reversible addition fragmentation chain transfer agent (hereafter referred to as a "RAFT agent") as a polymerization initiator, and is a method that enables living characteristics to be achieved in radical polymerization. Examples of compounds that can be used as the RAFT agent include thiocarbonylthio compounds such as dithioesters, dithiocarbamates, trithiocarbonates and xanthates. Examples of commercially available products that can be used favorably include 4-cyano-4-(phenylcarbonothioylthio)pentanoic acid (722995, manufactured by Sigma-Aldrich Co. LLC.) and 2-cyano-2-propyl dodecyl trithiocarbonate (723037, manufactured by Sigma-Aldrich Co. LLC.).

Next, the functional group having reactivity with a polyvalent isocyanate compound is introduced into the obtained copolymer (block acrylic polymer) by reaction between the functional group that can react with an amino group and an aminoalcohol, thereby synthesizing an amine-modified block acrylic polymer and obtaining the dispersant. Details regarding this step are the same as those described above for the random polymer dispersant.

The method used for producing a pigment complex using this amine-modified block acrylic polymer in combination with a pigment and a polyvalent isocyanate compound is also the same as that described above for the random polymer dispersant.

Although there are no particular limitations on the molecular weight (mass-average molecular weight) of the amine-modified block acrylic polymer that constitutes the block polymer dispersant, if the ink is to be used as an inkjet ink, then from the viewpoint of ink dischargeability, the molecular weight is preferably within a range from approximately 10,000 to 100,000, and more preferably from approximately 10,000 to 80,000. Moreover, in the case of the dispersant of the present embodiment, superior fixability can be achieved when the molecular weight is approximately 20,000 to 50,000.

The molecular weight of this amine-modified block acrylic polymer is substantially the same as the molecular weight of the block acrylic polymer, and therefore by controlling the molecular weight in the polymerization process for the block acrylic monomer, an amine-modified block acrylic polymer having a molecular weight within the desired range can be obtained.

Within the amine-modified block acrylic polymer, the mass-average molecular weight of the block A portion obtained by polymerization of the monomer mixture a comprising the monomer (A) is preferably within a range from approximately 5,000 to 40,000, and more preferably from approximately 8,000 to 30,000. This ensures that the solvent affinity of the block A portion falls within the most suitable range.

This molecular weight of the block A portion can be adjusted during the stage of polymerizing the monomer mixture a.

In the block pigment complex, from the viewpoint of pigment dispersibility, the ratio of the total amount of the polymer component, including the dispersant and the polyvalent isocyanate compound, relative to the pigment, is preferably a mass ratio within a range from 0.05 to 2.0, and more preferably from 0.4 to 1.5, relative to a value of 1 for the pigment.

In the block pigment complex, the proportion of the polyvalent isocyanate compound relative to the total mass of the polymer component including the block polymer dispersant and the polyvalent isocyanate compound is preferably within a range from 10 to 50% by mass, and more preferably from 20 to 45% by mass.

In the block pigment complex, the mass ratio of the polyvalent isocyanate compound relative to a value of 1 for the pigment is preferably from 0.05 to 1.0, and more preferably from 0.1 to 0.6.

The average particle size of the block pigment complex is preferably not more than approximately 300 nm, more preferably 200 nm or less, and still more preferably 150 nm or less. On the other hand, in order to suppress show-through on the printed item, the average particle size is preferably at least approximately 50 nm. In this description, the average particle size of the pigment complex can be measured, for example, using a dynamic light-scattering particle size distribution measurement apparatus LB-500 manufactured by Horiba, Ltd.

Further, the block pigment complex formed from the block polymer dispersant is able to achieve superior dispersion stability within the non-aqueous solvent of the ink, and particularly within non-polar solvents. This is because by producing the polymer as a block copolymer, the block A having an alkyl group of 12 or more carbon atoms is able to be oriented on the solvent side, thereby enhancing the dispersibility even in non-polar solvents.

Furthermore, by combining the block polymer dispersant with a non-polar solvent, the fixability of the ink to recording media can be enhanced while ensuring favorable dispersion stability.

When used with a block pigment complex, the distillation range of the non-aqueous solvent is preferably at least 150° C., and more preferably 170° C. or higher. This enables the fixability to be improved. Further, favorable stability within printing devices can also be achieved. For example, during the process of discharging the ink, evaporation of the solvent within the ink can be prevented, enabling nozzle blockages to be prevented. Furthermore, the distillation range of the non-aqueous solvent is preferably not higher than 270° C., more preferably 250° C. or lower, and still more preferably 200° C. or lower. This accelerates the evaporation of the solvent within the ink applied to the printed item by printing, thereby preventing show-through.

The amount of solvent that satisfies the above distillation range, relative to the total mass of solvent contained within the ink, is preferably at least 60% by mass, more preferably at least 80% by mass, and still more preferably 90% by mass or more. Inks in which all of the ink solvent is composed of one or more non-polar solvents is particularly desirable.

When used with a block pigment complex, the boiling point of the non-aqueous solvent is preferably at least 100° C., and more preferably 120° C. or higher, for the same reasons as those outlined above for the distillation range. This enables favorable stability within printing devices to be achieved. Further, the boiling point of the non-aqueous solvent is preferably not higher than 300° C., more preferably 250° C. or lower, and still more preferably 200° C. or lower.

Preferred examples of this type of non-aqueous solvent among the various non-aqueous solvents mentioned above include hydrocarbon-based solvents. Aliphatic and alicyclic hydrocarbon-based solvents are more preferable, and n-paraffin-based solvents isoparaffin-based solvents, and naphthene-based solvents are particularly desirable. Examples of commercially available solvents include the aforementioned No. 0 solvent L, M and H, Isosol 300 and 400, AF-4, IP solvent 1620 and 2028, IP Clean LX, and Isopar G, H, L and M.

According to the present invention, a non-aqueous pigment ink that exhibits improved fixability of the ink to recording media and low ink viscosity.

<Block Pigment Complex>

The method of producing the pigment complex according to the present embodiment comprises a step of adsorbing a dispersant to a pigment, and a step of performing crosslinking between molecules of the dispersant using a polyvalent isocyanate compound, wherein the dispersant is a block copolymer comprising a block formed from a monomer mixture comprising an alkyl (meth)acrylate (A) having an alkyl group of 12 or more carbon atoms, and a block formed from a monomer mixture comprising a reactive (meth)acrylate (B) having a functional group that can react with an amino group, and the copolymer has a functional group having reactivity with a polyvalent isocyanate compound that has been introduced by a reaction between the functional group that can react with an amino group and an aminoalcohol.

By employing this method, a pigment complex can be provided that can improve the fixability of the ink to recording media, and keep the viscosity of the ink low. Further, superior storage stability can be achieved even for non-aqueous solvents, and particularly solvents of low polarity.

In this method, the dispersant corresponds with the aforementioned amine-modified block acrylic polymer, and the alkyl (meth)acrylate (A) and the reactive (meth)acrylate (B) correspond with the aforementioned monomer (A) and monomer (B) respectively.

EXAMPLES

The present invention is described below in further detail using a series of examples, but the present invention is in no way limited by these examples. Unless specifically stated otherwise, components that are common across all the examples used the same compounds.

Example 1

(Step (1): Preparation of Acrylic Polymer (a))

The composition and physical properties of an acrylic polymer used for preparing a dispersant are shown in Table 1.

A 500 ml four-neck flask was charged with 100 g of AF4 (a petroleum-based hydrocarbon solvent, manufactured by JX Nippon Oil & Energy Corporation), and the temperature was raised to 110° C. under a stream of nitrogen gas and with constant stirring. Next, with the temperature held at 110° C., to a mixture containing a monomer mixture containing each of the monomers shown below, 25 g of AF4 and 0.67 g of Perbutyl 0 (t-butylperoxy-2-ethylhexanoate, manufactured by NOF Corporation) was added dropwise over a period of 3 hours. Subsequently, with the temperature maintained at 110° C., additional 0.5 g samples of Perbutyl 0 were added after an additional one hour and two hours respectively.

Monomers:
Monomer A: behenyl methacrylate 70.00 g
Monomer B: glycidyl methacrylate 15.00 g
Monomer C: 2-acetoacetoxyethyl methacrylate 15.00 g Details concerning the above monomers are as shown below.

Behenyl methacrylate (VMA): molecular weight 339, carbon number of alkyl group 22, manufactured by NOF Corporation.

Glycidyl methacrylate (GMA): molecular weight 142, manufactured by Wako Pure Chemical Industries, Ltd.

2-acetoacetoxyethyl methacrylate (AAEM): molecular weight 214, manufactured by Nippon Synthetic Chemistry Industry Co., Ltd.

Following heating at 110° C. for one hour, the reaction mixture was diluted with the remaining AF4 (27.00 g), yielding an acrylic polymer a having a non-volatile fraction of 40% by mass.

The mass-average molecular weight of the obtained acrylic polymer a (determined by a GPC method and referenced against standard polystyrenes, this also applies to molecular weight values mentioned below) was 40,000.

The molar ratio of [monomers B and C:monomer A] was determined from the molar ratio between the combined total of the amounts of added monomers B and C and the amount of added monomer A. This molar ratio is also shown in Table 1.

(Step (2): Preparation of Amine-Modified Acrylic Polymer (A-a))

The composition and physical properties of an amine-modified acrylic polymer that constitutes a dispersant are shown in Table 2.

A 100 ml four-neck flask was charged with 50.00 g of the acrylic polymer a and 2.19 g of diethanolamine (manufactured by Wako Pure Chemical Industries, Ltd.), and the mixture was heated at 110° C. for 2 hours under a stream of nitrogen gas and with constant stirring. The resulting product was then diluted with 3.30 g of AF4, yielding an amine-modified acrylic polymer A-a having a non-volatile fraction of 40% by mass.

The mass-average molecular weight of the obtained amine-modified acrylic polymer A-a was 40,000.

Further, the molar ratio of the diethanolamine relative to the monomer B was determined from the molar ratio of the amount of added diethanolamine relative to the amount of added monomer B. The result is shown in Table 2.

(Step (3): Preparation of Pigment Dispersion)

An ink formulation and the results of evaluating the ink are shown in Table 3. Of the components shown in Table 3, the components of the pigment dispersion, namely a pigment MA11 (carbon black, manufactured by Mitsubishi Chemical Corporation), the amine-modified acrylic polymer as a dispersant, and isooctyl palmitate as a solvent (Nikkol IOP, an ester-based solvent, manufactured by Nikko Chemicals Co., Ltd.) were premixed in the ratio shown in Table 3 to prepare a liquid preparation, and 35 g of this liquid preparation was placed in a glass container, 100 g of zirconia beads (00.5 mm) were added, and the mixture was dispersed for two hours using a rocking mill (RM05S manufactured by Seiwa Technical Lab Co., Ltd.) at a frequency of 65 Hz. This operation was repeated a plurality of times to complete preparation of a pigment dispersion.

(Step (4): Preparation of Ink)

Using the ratio shown in Table 3, a four-neck flask was charged with the pigment dispersion and a portion of the AF4 (40% by mass of the 47.41% by mass), and the temperature was increased to 110° C. Subsequently, a dibutyltin dilaurate catalyst (manufactured by Wako Pure Chemical Industries, Ltd.) was added, and a mixture containing propylene glycol (molecular weight: 76.1, manufactured by Wako Pure Chemical Industries, Ltd.), 1,3-bis(isocyanatomethyl)cyclohexane (Takenate 600, molecular weight: 192, manufactured by Mitsui Chemicals, Inc.) and the remaining AF4 (the remaining 7.41% by mass) was then added dropwise to the flask over a period of 30 minutes. Following completion of the dropwise addition, the reaction was allowed to proceed for 3 hours. The dibutyltin dilaurate catalyst was added in an amount of 0.03% by mass relative to the 100% by mass of the components shown in Table 3.

Examples 2 to 16

Using the same method as that described above for Example 1, various acrylic polymers were prepared with the formulations shown in Table 1, various amine-modified acrylic polymers were prepared with the formulations shown in Table 2, and various inks were prepared with the formulations shown in Tables 3 to 5.

In Example 4, 1,3-bis(isocyanatomethyl)benzene (molecular weight: 188.18, manufactured by Wako Pure Chemical Industries, Ltd.) was used as the polyvalent isocyanate compound. In Examples 11 to 15, Duranate TSA-100 (hexamethylene diisocyanate (trimer isocyanurate structure), NCO: 20.6% by mass, manufactured by Asahi Kasei Chemicals Corporation) was used as the polyvalent isocyanate compound. In Example 16, Duranate AE700-100 (hexamethylene diisocyanate (adduct structure), NCO: 12% by mass, manufactured by Asahi Kasei Chemicals Corporation) was used.

Comparative Examples 1 and 2

The ink formulations of Comparative Examples 1 and 2, and the results of evaluating the inks are shown in Table 6.

In Comparative Example 1, an acrylic polymer g was adsorbed to the pigment, and a diamine was then reacted with the acrylic polymer g adsorbed on the pigment surface, thus forming a bridged structure.

First, the acrylic polymer g was obtained using the same method as that described above for step (1). In the acrylic polymer g, the monomer mixture included dimethylaminoethyl methacrylate (molecular weight: 143.18, manufactured by Wako Pure Chemical Industries, Ltd.) in addition to the monomers A and B.

Of the components shown in Table 6, the components of the pigment dispersion, namely the pigment, the acrylic polymer g, and the solvent were premixed in the ratio shown in Table 6 to prepare a liquid preparation, and 35 g of the thus obtained liquid preparation was placed in a glass container, 100 g of zirconia beads (φ0.5 mm) were added, and the mixture was dispersed for two hours using a rocking mill at a frequency of 65 Hz. This operation was repeated a plurality of times to complete preparation of a pigment dispersion.

The thus obtained pigment dispersion and a diamine (Duomeen T, compound name: N-(tallow alkyl)-1,3-diaminopropane, manufactured by Lion Akzo Co., Ltd.) were placed in a beaker and stirred at 80° C. for 3 hours to obtain the ink of Comparative Example 1.

The ink of Comparative Example 2 was obtained in the same manner as the ink of Comparative Example 1, with the exception of using a triamine (Triameen Y12D, an alkyltriamine having an amine value of 335 to 365, in which the alkyl composition is 98% C12, manufactured by Lion Akzo Co., Ltd.) in the ratio shown in Table 6.

Comparative Examples 3 to 6

The formulations and states of urethane-modified acrylic polymers of Comparative Examples 3 to 6 are shown in Table 7, and the ink formulation of Comparative Example 3, and the results of evaluating the ink are shown in Table 8.

In Comparative Example 3, a urethane-modified acrylic polymer U-a is first synthesized, and this is added to the ink as a dispersant. In the synthesis of the urethane-modified acrylic polymer U-a, the acrylic polymer d was obtained using the same method as that described above for step (1), 0.16 g of diethanolamine was then added to 15 g of this acrylic polymer d, the temperature was raised to 110° C., and following heating for one hour, 0.11 g of propylene glycol and 0.01 g of dibutyltin dilaurate were added, and then a mixture containing 0.57 g of 1,3-bis(isocyanatomethyl)cyclohexane and 1.26 g of AF4 was added dropwise to the flask over a period of 30 minutes. Following completion of the dropwise addition, the mixture was allowed to react for 3 hours, yielding the urethane-modified acrylic polymer U-a. In the urethane-modified acrylic polymer U-a, the acrylic polymer d functions as the trunk polymer, and the diethanolamine, propylene glycol and the polyvalent isocyanate compound are bonded to this trunk polymer as branch polymers via urethane linkages.

Subsequently, the pigment, the urethane-modified acrylic polymer U-a and the solvent were premixed in the ratio shown in Table 7 to prepare a liquid preparation, and 35 g of this liquid preparation was placed in a glass container, 100 g of zirconia beads (φ0.5 mm) were added, and the mixture was dispersed for two hours using a rocking mill at a frequency of 65 Hz. This operation was repeated a plurality of times to complete preparation of the ink of Comparative Example 3.

In the syntheses of the urethane-modified acrylic polymers of Comparative Examples 4 to 6, with the exception of combining the components in the ratios shown in Table 7, urethane-modified acrylic polymers U-b, U-c and U-d respectively were obtained in the same manner as Comparative Example 3.

In the case of the urethane-modified acrylic polymers U-b, U-c and U-d obtained in Comparative Examples 4 to 6, the polymers themselves gelled. Accordingly, inks could not be prepared using these polymers.

Comparative Examples 7 and 8

The ink formulations of Comparative Examples 7 and 8 are shown in Table 9.

In Comparative Example 7, the ink was formulated using the amine-modified acrylic polymer A-a as the dispersant.

In the preparation of the ink of Comparative Example 7, the pigment, the amine-modified acrylic polymer A-a and the solvent were premixed in the ratio shown in Table 9 to prepare a liquid preparation, and 35 g of this liquid preparation was placed in a glass container, 100 g of zirconia beads (ϕ0.5 mm) were added, and the mixture was dispersed for two hours using a rocking mill at a frequency of 65 Hz. This operation was repeated a plurality of times to complete preparation of the ink.

The ink of Comparative Example 8 was prepared in the same manner as that described above for Comparative Example 7, with the exception of using the amine-modified acrylic polymer A-b.

TABLE 1

Acrylic polymers: composition and physical properties

| Polymer composition (g) | | Acrylic polymer | | | | | | |
|---|---|---|---|---|---|---|---|---|
| | | a | b | c | d | e | f | g |
| Solvent | AF4 | 100.00 | 100.00 | 100.00 | 100.00 | 100.00 | 100.00 | 100.00 |
| Monomer A | Behenyl methacrylate | 70.00 | 70.00 | 70.00 | 70.00 | 70.00 | 85.00 | 80.00 |
| Monomer B | Glycidyl methacrylate | 15.00 | 15.00 | 15.00 | 15.00 | 30.00 | 15.00 | 10.00 |
| Monomer C | 2-acetoacetoxyethyl methacrylate | 15.00 | 15.00 | 15.00 | 15.00 | — | — | — |
| Dimethylaminoethyl methacrylate | | — | — | — | — | — | — | 10.00 |
| Polymerization initiator | Perbutyl O | 1.17 | 2.17 | 3.42 | 6.67 | 2.17 | 2.17 | 1.50 |
| Diluting solvent | AF4 | 52.00 | 53.00 | 55.00 | 60.00 | 53.00 | 53.00 | 52.00 |
| Total mass of polymer composition (g) | | 253.17 | 255.17 | 258.42 | 266.67 | 255.17 | 255.17 | 253.50 |
| Mass-average molecular weight of acrylic polymer | | 40,000 | 30,000 | 20,000 | 10,000 | 30,000 | 30,000 | 20,000 |
| Molar ratio of [monomers B and C:monomer A] | | 49:51 | 49:51 | 49:51 | 49:51 | 54:46 | 33:67 | 26:74 |

TABLE 2

Amine-modified acrylic polymers: composition and physical properties

| Composition (g) | Amine-modified acrylic polymer | | | | |
|---|---|---|---|---|---|
| | A-a | A-b | A-c | A-d | A-e |
| Acrylic polymer a | 50.00 | — | — | — | — |
| Acrylic polymer b | — | 50.00 | — | — | — |
| Acrylic polymer c | — | — | 50.00 | — | — |
| Acrylic polymer e | — | — | — | 50.00 | — |
| Acrylic polymer f | — | — | — | — | 50.00 |
| Diethanolamine | 2.19 | 2.17 | 2.15 | 4.34 | 2.17 |
| AF4 | 3.30 | 3.30 | 3.20 | 6.50 | 3.30 |
| Total (g) | 55.49 | 55.47 | 55.35 | 60.84 | 55.47 |
| Mass-average molecular weight of amine-modified acrylic polymer | 40,000 | 30,000 | 20,000 | 30,000 | 30,000 |
| Molar ratio (equivalents) of diethanolamine relative to monomer B | 1.00 | 1.00 | 1.00 | 1.00 | 1.00 |

TABLE 3

Examples: ink formulations and results of evaluating inks

| | | Units: % by mass | Example 1 | Example 2 | Example 3 | Example 4 | Example 5 | Example 6 |
|---|---|---|---|---|---|---|---|---|
| Pigment dispersion | Pigment | MA11 | 10.00 | 10.00 | 10.00 | 10.00 | 10.00 | 10.00 |
| | Dispersant: amine-modified | A-a | 15.00 | 15.00 | — | — | — | — |
| | | A-b | — | — | 15.00 | 15.00 | 15.00 | 15.00 |

TABLE 3-continued

Examples: ink formulations and results of evaluating inks

| Units: % by mass | | Example 1 | Example 2 | Example 3 | Example 4 | Example 5 | Example 6 |
|---|---|---|---|---|---|---|---|
| acrylic polymer (solution) | A-c | — | — | — | — | — | — |
| | A-d | — | — | — | — | — | — |
| | A-e | — | — | — | — | — | — |
| Solvent | Isooctyl palmitate | 25.00 | 25.00 | 25.00 | 25.00 | 25.00 | 25.00 |
| Polyhydric alcohol | Propylene glycol | 0.43 | 0.11 | 0.85 | 0.43 | 0.21 | 0.11 |
| Polyvalent isocyanate compound | 1,3-bis(isocyanato methyl)cyclohexane | 2.16 | 1.35 | 3.22 | — | 1.61 | 1.34 |
| | 1,3-bis(isocyanato methyl)benzene | — | — | — | 2.10 | — | — |
| Solvent | AF4 | 47.41 | 48.54 | 45.93 | 47.47 | 48.18 | 48.55 |
| Total (% by mass) | | 100.00 | 100.00 | 100.00 | 100.00 | 100.00 | 100.00 |
| Mass-average molecular weight of amine-modified acrylic polymer | | 40,000 | 40,000 | 30,000 | 30,000 | 30,000 | 30,000 |
| Solid fraction of total polymer (% by mass) | | 8.59 | 7.46 | 10.07 | 8.53 | 7.82 | 7.45 |
| Total mass of polymer relative to a value of 1 for the pigment (mass ratio) | | 0.86 | 0.75 | 1.01 | 0.85 | 0.78 | 0.75 |
| Molar ratio (equivalents) of diethanolamine relative to monomer B | | 1.00 | 1.00 | 1.00 | 1.00 | 1.00 | 1.00 |
| Molar ratio (equivalents) of propylene glycol relative to diethanolamine | | 1.00 | 0.25 | 2.00 | 1.00 | 0.50 | 0.25 |
| Molar ratio (equivalents) of polyvalent isocyanate compound relative to diethanolamine and propylene glycol | | 1.00 | 1.00 | 1.00 | 1.00 | 1.00 | 1.00 |
| Proportion of polyvalent isocyanate compound within total polymer (% by mass) | | 25.2 | 18.1 | 32.0 | 24.7 | 20.6 | 18.0 |
| Molar ratio of [monomers B and C:monomer A] | | 49:51 | 49:51 | 49:51 | 49:51 | 49:51 | 49:51 |
| Evaluation results | Ink viscosity | A | A | A | AA | AA | AA |
| | Storage stability | A | A | A | A | A | A |
| | Fixability | A | A | A | A | A | A |
| | Image density | A | A | A | A | A | A |
| | Show-through | A | A | A | A | A | A |

TABLE 4

Examples: ink formulations and results of evaluating inks

| | | | Units: % by mass | | | |
|---|---|---|---|---|---|---|
| | | | Example 7 | Example 8 | Example 9 | Example 10 |
| Pigment dispersion | Pigment | MA11 | 10.00 | 10.00 | 10.00 | 10.00 |
| | Dispersant: amine-modified acrylic polymer (solution) | A-a | — | — | — | — |
| | | A-b | — | — | — | — |
| | | A-c | 15.00 | 15.00 | — | — |
| | | A-d | — | — | 15.00 | — |
| | | A-e | — | — | — | 15.00 |
| | Solvent | Isooctyl palmitate | 25.00 | 25.00 | 25.00 | 25.00 |
| Polyhydric alcohol | Propylene glycol | | 0.84 | 0.42 | 0.39 | 0.43 |
| Polyvalent isocyanate compound | 1,3-bis(isocyanato-methyl) cyclohexane | | 3.19 | 2.12 | 2.94 | 2.15 |
| | 1,3-bis(isocyanato-methyl) benzene | | — | — | — | — |
| Solvent | AF4 | | 45.97 | 47.45 | 46.68 | 47.43 |
| Total (% by mass) | | | 100.00 | 100.00 | 100.00 | 100.00 |
| Mass-average molecular weight of amine-modified acrylic polymer | | | 20,000 | 20,000 | 30,000 | 30,000 |
| Solid fraction of total polymer (% by mass) | | | 10.03 | 8.55 | 9.32 | 8.57 |
| Total mass of polymer relative to a value of 1 for the pigment (mass ratio) | | | 1.00 | 0.86 | 0.93 | 0.86 |
| Molar ratio (equivalents) of diethanolamine relative to monomer B | | | 1.00 | 1.00 | 1.00 | 1.00 |
| Molar ratio (equivalents) of propylene glycol relative to diethanolamine | | | 2.00 | 1.00 | 0.50 | 1.00 |
| Molar ratio (equivalents) of polyvalent isocyanate compound relative to diethanolamine and propylene glycol | | | 1.00 | 1.00 | 1.00 | 1.00 |
| Proportion of polyvalent isocyanate compound within total polymer (% by mass) | | | 31.8 | 24.9 | 31.5 | 25.0 |

TABLE 4-continued

Examples: ink formulations and results of evaluating inks

| | | Units: % by mass | | | |
|---|---|---|---|---|---|
| | | Example 7 | Example 8 | Example 9 | Example 10 |
| Molar ratio of [monomers B and C:monomer A] | | 49:51 | 49:51 | 54:46 | 33:67 |
| Evaluation results | Ink viscosity | A | AA | A | A |
| | Storage stability | A | A | A | A |
| | Fixability | A | A | A | B |
| | Image density | A | A | A | A |
| | Show-through | A | A | A | A |

TABLE 5

Examples: ink formulations and results of evaluating inks

| Units: % by mass | | | Example 11 | Example 12 | Example 13 | Example 14 | Example 15 | Example 16 |
|---|---|---|---|---|---|---|---|---|
| Pigment dispersion | Pigment | MA11 | 10.00 | 10.00 | 10.00 | 10.00 | 10.00 | 10.00 |
| | Dispersant: amine-modified acrylic polymer (solution) | A-b | 15.00 | 15.00 | — | — | — | — |
| | | A-c | — | — | — | — | 15.00 | — |
| | | A-d | — | — | 15.00 | 15.00 | — | 15.00 |
| | Solvent | Isooctyl palmitate | 25.00 | 25.00 | 25.00 | 25.00 | 25.00 | 25.00 |
| Polyhydric alcohol | | Propylene glycol | 0.43 | — | — | — | 0.42 | — |
| Polyvalent isocyanate compound | | Duranate TSA-100 | 4.56 | 2.26 | 2.08 | 4.16 | 4.51 | — |
| | | Duranate AE700-100 | — | — | — | — | — | 3.57 |
| Solvent | | AF4 | 45.02 | 47.74 | 47.92 | 45.84 | 45.07 | 46.43 |
| Total (% by mass) | | | 100.00 | 100.00 | 100.00 | 100.00 | 100.00 | 100.00 |
| Mass-average molecular weight of amine-modified acrylic polymer | | | 30,000 | 30,000 | 30,000 | 30,000 | 20,000 | 30,000 |
| Solid fraction of total polymer (% by mass) | | | 10.6 | 8.3 | 8.1 | 10.2 | 10.5 | 9.6 |
| Total mass of polymer relative to a value of 1 for the pigment (mass ratio) | | | 1.06 | 0.83 | 0.81 | 1.02 | 1.05 | 0.96 |
| Molar ratio (equivalents) of diethanolamine relative to monomer B | | | 1.00 | 1.00 | 1.00 | 1.00 | 1.00 | 1.00 |
| Molar ratio (equivalents) of propylene glycol relative to diethanolamine | | | 1.00 | 0.00 | 0.00 | 0.00 | 1.00 | 0.00 |
| Molar ratio (equivalents) of polyvalent isocyanate compound relative to diethanolamine and propylene glycol | | | 1.00 | 1.00 | 0.50 | 1.00 | 1.00 | 0.50 |
| Proportion of polyvalent isocyanate compound within total polymer (% by mass) | | | 43.2 | 27.3 | 25.7 | 40.9 | 42.9 | 37.3 |
| Molar ratio of [monomers B and C:monomer A] | | | 49:51 | 49:51 | 54:46 | 54:46 | 49:51 | 54:46 |
| Evaluation results | Ink viscosity | | A | AA | AA | A | AA | B |
| | Storage stability | | A | A | A | A | A | B |
| | Fixability | | AA | AA | AA | AA | AA | AA |
| | Image density | | A | A | A | A | A | A |
| | Show-through | | A | A | A | A | A | A |

TABLE 6

Comparative Examples 1 and 2: ink formulations and results of evaluating inks

| | | | Units: % by mass | |
|---|---|---|---|---|
| | | | Comparative Example 1 | Comparative Example 2 |
| Pigment dispersion | Pigment | MA11 | 10.00 | 10.00 |
| | Dispersant | Acrylic polymer g | 15.00 | 15.00 |
| | Solvent | Isooctyl palmitate | 25.00 | 25.00 |
| Amine compound | | Diamine | 0.32 | — |
| | | Triamine | — | 0.57 |
| Solvent | | AF4 | 49.68 | 49.43 |
| Total (% by mass) | | | 100.00 | 100.00 |

TABLE 6-continued

Comparative Examples 1 and 2: ink formulations and results of evaluating inks

Units: % by mass

|  |  | Comparative Example 1 | Comparative Example 2 |
|---|---|---|---|
| Mass-average molecular weight of acrylic polymer |  | 20,000 | 20,000 |
| Evaluation results | Ink viscosity | B | B |
|  | Storage stability | A | A |
|  | Fixability | C | C |
|  | Image density | B | B |
|  | Show-through | B | B |

TABLE 7

Comparative Examples 3 to 6: formulation and state of urethane-modified acrylic polymers

| Composition (g) |  |  | Comparative Example 3 | Comparative Example 4 | Comparative Example 5 | Comparative Example 6 |
|---|---|---|---|---|---|---|
| Urethane-modified acrylic polymer |  |  | U-a | U-b | U-c | U-d |
| Trunk polymer | Acrylic polymer b |  | — | 15.00 | — | 15.00 |
|  | Acrylic polymer c |  | — | — | 15.00 | — |
|  | Acrylic polymer d |  | 15.00 | — | — | — |
| Branch polymer | Diethanolamine |  | 0.16 | 0.65 | 0.64 | 0.33 |
|  | Propylene glycol |  | 0.11 | 0.47 | 0.47 | 0.24 |
|  | Polyvalent isocyanate compound | 1,3-bis(isocyanato methyl)cyclohexane | 0.57 | 2.38 | 2.35 | 1.19 |
|  |  | 1,3-bis(isocyanato methyl)benzene | — | — | — | — |
| Solvent: AF4 |  |  | 1.26 | 5.26 | 5.19 | 2.63 |
| Total (g) |  |  | 17.10 | 23.76 | 23.65 | 19.38 |
| Mass-average molecular weight of urethane-modified acrylic polymer |  |  | 25,000 | — | — | — |
| Molar ratio (equivalents) of diethanolamine relative to monomer B |  |  | 0.25 | 1.00 | 1.00 | 0.50 |
| Molar ratio (equivalents) of propylene glycol relative to diethanolamine |  |  | 1.00 | 1.00 | 1.00 | 1.00 |
| Molar ratio (equivalents) of polyvalent isocyanate compound relative to diethanolamine and propylene glycol |  |  | 1.00 | 1.00 | 1.00 | 1.00 |
| Proportion of polyvalent isocyanate compound within total polymer (% by mass) |  |  | 8.3 | 25.1 | 24.9 | 15.4 |
| Polymer state |  |  | dissolved | gelled | gelled | gelled |

TABLE 8

Comparative Example 3: ink formulation and results of evaluating ink

Units: % by mass

|  |  | Comparative Example 3 |
|---|---|---|
| Pigment | MA11 | 10.00 |
| Dispersant | Urethane-modified acrylic polymer U-a | 15.00 |
| Solvent | Isooctyl palmitate | 25.00 |
|  | AF4 | 50.00 |
| Total (% by mass) |  | 100.00 |
| Solid fraction of urethane-modified acrylic polymer (% by mass) |  | 40.00 |
| Proportion of polyvalent isocyanate compound within total polymer (% by mass) |  | 8.3 |

TABLE 8-continued

Comparative Example 3: ink formulation and results of evaluating ink

Units: % by mass

|  |  | Comparative Example 3 |
|---|---|---|
| Evaluation results | Ink viscosity | B |
|  | Storage stability | A |
|  | Fixability | C |
|  | Image density | A |
|  | Show-through | A |

TABLE 9

Comparative Examples 7 and 8: ink formulations and results of evaluating inks

Units: % by mass

|  |  |  | Comparative Example 7 | Comparative Example 8 |
|---|---|---|---|---|
| Ink | Pigment | MA11 | 10.00 | 10.00 |
|  | Dispersant | Amine-modified acrylic polymer A-a | 15.00 | — |
|  |  | Amine-modified acrylic polymer A-b | — | 15.00 |
|  | Solvent | Isooctyl palmitate | 25.00 | 25.00 |
|  |  | AF4 | 50.00 | 50.00 |
|  | Total (% by mass) |  | 100.00 | 100.00 |
| Mass-average molecular weight of amine-modified acrylic polymer |  |  | 40,000 | 30,000 |

TABLE 9-continued

Comparative Examples 7 and 8: ink formulations and results of evaluating inks

|  |  | Units: % by mass | |
| --- | --- | --- | --- |
|  |  | Comparative Example 7 | Comparative Example 8 |
| Evaluation results | Ink viscosity | AA | AA |
|  | Storage stability | B | B |
|  | Fixability | C | C |
|  | Image density | C | C |
|  | Show-through | C | C |

<Evaluations>

Using each of the inks described above, evaluations were performed of the ink viscosity, storage stability, fixability, image density and show-through. The results of these evaluations are shown in each of the tables.

(Ink Viscosity)

The ink viscosity refers to the viscosity of the ink when the pigment concentration within the ink is 10% by mass. The ink viscosity refers to the viscosity at 10 Pa when the shear stress was raised from 0 Pa at a rate of 0.1 Pa/s and at a temperature of 23° C., and was measured using a Rheometer AR-G2, manufactured by TA Instruments, Japan Inc. (cone angle: 2°, diameter 40 mm), and then evaluated against the following criteria.

AA: ink viscosity of 9 mPa·s or less
A: ink viscosity of more than 9 mPa·s but 13 mPa·s or less
B: ink viscosity of more than 13 mPa·s but less than 15 mPa·s
C: ink viscosity of 15 mPa·s or more (Storage Stability)

Following measurement of the initial viscosity of each of the inks described above, each ink was placed in a sealed container and left to stand for one week in an environment at 70° C. The viscosity of the ink was then remeasured, and the change in the viscosity ((1−(viscosity after standing)/(initial viscosity))×100(%)) was determined and evaluated against the following criteria. The ink viscosity was measured in the same manner as that described above for the ink viscosity evaluation.

A: change in viscosity of ±2% or less
B: change in viscosity of more than 12% but less than 15%
C: change in viscosity of 15% or more (Fixability of Printed Item)

Each of the inks described above was mounted in a line-type inkjet printer "Orphis-X9050" (manufactured by Riso Kagaku Corporation, this also applies below), and a printed item was obtained by printing a solid black image at 300×300 dpi onto glossy paper (Canon Photo Paper, Gloss Pro [platina grade], PT-101, manufactured by Canon Inc.). The printed portion of the obtained printed item was rubbed with a finger, any change in the printed portion following rubbing was observed visually, and the fixability of the printed item was evaluated against the criteria listed below. The Orphis X9050 is a system that uses a line-type inkjet head, wherein the paper is transported in a sub-scanning direction perpendicular to the main scanning direction (the direction along which the nozzles are aligned) while printing is conducted.

AA: even after rubbing the same portion 10 times, no change in the printed portion was observed
A: no change in the printed portion was observed when the same portion was rubbed up to 9 times
B: the printed portion lightened when the same portion was rubbed 9 or fewer times C: the printed portion peeled when the same portion was rubbed 9 or fewer times (Image Density and Show-Through)

Each of the inks described above was mounted in the line-type inkjet printer "Orphis-X9050", and a printed item was obtained by printing a solid black image onto plain paper (Riso lightweight paper, manufactured by Riso Kagaku Corporation). The printed surface OD value and the rear surface OD value within the solid black image region of the printed item were measured using an optical densitometer (RD920, manufactured by Macbeth Corporation), and the image density and show-through were then evaluated against the following criteria. In the case of show-through, a lower rear surface OD value indicates a better evaluation.

[Image Density]

AA: printed surface OD value of 1.15 or greater
A: printed surface OD value of at least 1.05 but less than 1.15
B: printed surface OD value of at least 0.95 but less than 1.05
C: printed surface OD value of less than 0.95

[Show-Through]

A: rear surface OD value of less than 0.26
B: rear surface OD value of at least 0.26 but less than 0.30
C: rear surface OD value of at least 0.30

As illustrated in Table 3 and Table 4, the inks of the examples each exhibited favorable levels of inky viscosity, storage stability, fixability, image density and show-through.

In Examples 1 and 2, although the molecular weight of the dispersant was comparatively high, the fixability and also the ink viscosity and storage stability were favorable.

In Examples 4 to 6, the inks exhibited a more favorable low viscosity than Example 3 which used the same dispersant. It is thought that this is because the amount of the polyvalent isocyanate compound relative to the pigment was lower.

In Examples 7 and 8, the molecular weight of the dispersant was comparatively small, but the fixability was good. Moreover, in Example 8, the amount of the polyvalent isocyanate compound relative to the pigment was small, and the inky viscosity was more favorable.

In Examples 9 and 10, the amine-modified acrylic polymers A-h and A-i which did not contain the monomer C were used as dispersants. In Example 9, the amount of the polyvalent isocyanate compound relative to the pigment was higher, and the fixability improved.

Examples 11 to 16 were inks that used a hexamethylene diisocyanate comprising an isocyanurate ring or an adduct structure as the polyvalent isocyanate compound, and compared with Examples 1 to 10, the fixability was superior. Examples 11 to 15 used a hexamethylene diisocyanate comprising an isocyanurate ring, and exhibited more favorable ink viscosity and storage stability than Example 16 which used an isocyanate having an adduct structure.

In Comparative Examples 1 and 2, the acrylic polymer g adsorbed to the pigment was crosslinked using a diamine or triamine, and the fixability deteriorated.

In Comparative Example 3, an ink was prepared using the urethane-modified acrylic polymer U-a, but the fixability was inferior. The mass-average molecular weight of the polymer U-a was 25,000, but because the polymer U-a does not form a pigment complex, the action of fixing the pigment to the recording medium was weak, and the fixability deteriorated. Further, because the polymer U-a was dispersed throughout the entire ink, not only did the fixability deteriorate, but the ink viscosity also increased. In Comparative Examples 4 to 6, the proportion of the polyvalent isocyanate compound within the polymer was large, and because crosslinking occurred between polymer molecules, gelling occurred during the synthesis of the polymers U-b to U-d, meaning inks could not be prepared.

In Comparative Examples 7 and 8, an amine-modified acrylic polymer was used as the dispersant, and the fixability, image density and show-through all deteriorated. In comparison, in Examples 1 to 4, pigment complexes were used in which the same amine-modified acrylic polymers were adsorbed to the pigment and crosslinked using a polyvalent isocyanate compound, and these inks exhibited favorable fixability, image density and show-through.

Next is a description of examples in which an amine-modified block acrylic polymer is used as a dispersant.

Example 17

(Step (1-1): First Stage, Preparation of Acrylic Polymer (PA))

The composition and physical properties of an acrylic polymer used for preparing a dispersant are shown in Table 10.

Using the composition ratio for the first stage shown in Table 10, a round-bottom flask was charged with dodecyl methacrylate, 2-cyano-2-propyl dodecyl trithiocarbonate (manufactured by Sigma-Aldrich Co. LLC.), AIBN (manufactured by Wako Pure Chemical Industries, Ltd.) and ethyl acetate (manufactured by Wako Pure Chemical Industries, Ltd.). Following thorough deaeration, the atmosphere inside the flask was replaced with an inert gas (argon), and the flask contents were then stirred under heat at 60° C. for 24 hours. The solid fraction (non-volatile fraction) of the thus obtained solution of the polymer PA1 was 40% by mass. The mass-average molecular weight of the polymer PA1 following reaction was 15,000.

(Step (1-2): Second Stage, Preparation of Block Acrylic Polymer (PA-(A)B))

The composition and physical properties of a block acrylic polymer used for preparing a dispersant are shown in Table 10.

Following the reaction for preparing the polymer PA1, dodecyl methacrylate, glycidyl methacrylate, AIBN and ethyl acetate were added to the polymer PA1 in accordance with the composition of the second stage shown in Table 10. Deaeration and inert gas replacement were performed in the same manner as described above, and the reaction mixture was then stirred under heat at 60° C. for 24 hours. The solid fraction (non-volatile fraction) of the thus obtained solution of the polymer PA1-B1 was 40% by mass. The mass-average molecular weight of the polymer PA1-B1 obtained following reaction was 35,000. In the table, the amount shown for the polymer PA1 indicates the total amount of the polymer solution.

In Table 10, the proportion of the monomer A within the block acrylic polymer was determined from the molar ratio of the monomer A relative to the total amount of all the monomers. The proportion of the monomer B within the block acrylic polymer was determined from the molar ratio of the monomer B relative to the total amount of all the monomers.

The molar ratio of block A:block B was determined from the total number of moles of monomer used in the first stage and the total number of moles of monomer used in the second stage.

The proportion of the monomer A within the block A is the ratio of the number of moles of the monomer A relative to the total number of moles of all the monomers used in the first stage. The proportion of the monomer B within the block B is the ratio of the number of moles of the monomer B relative to the total number of moles of all the monomers used in the second stage.

In the monomer compositions shown in Table 10, A-AB represents a copolymer having a block comprising the monomer A and a block comprising the monomer A and the monomer B, whereas A-B represents a copolymer having a block comprising the monomer A and a block comprising the monomer B.

(Step (2): Preparation of Amine-Modified Block Acrylic Polymer (AmPA-(A)B))

The composition and physical properties of an amine-modified block acrylic polymer that constitutes a dispersant are shown in Table 11.

Following the reaction for preparing the block acrylic polymer PA1-B1, the ethyl acetate was removed from the polymer solution. Subsequently, using the composition shown in Table 11, a round-bottom flask was charged with the block acrylic polymer PA1-B1, which had a solid fraction of 100% by mass following removal of the ethyl acetate, and diethanolamine (manufactured by Wako Pure Chemical Industries, Ltd.), and the mixture was then diluted with AF4. The contents of the flask were then stirred under heating at 110° C. for 3 hours, yielding an amine-modified block acrylic polymer AmPA1-B1 having a solid fraction (non-volatile fraction) of 40% by mass.

The mass-average molecular weight of the thus obtained amine-modified block acrylic polymer AmPA1-B1 was the same as that of the block acrylic polymer PA1-B1.

In Table 11, the molar ratio of the diethanolamine relative to the monomer B was determined from the molar ratio of the amount of added diethanolamine relative to the amount of added monomer B.

(Step (3): Preparation of Pigment Dispersion)

Ink formulations of examples and comparative examples, and the results of evaluating those inks are shown in Table 14.

Of the components shown in Table 14, the components of the pigment dispersion, namely a pigment MA11 (carbon black, manufactured by Mitsubishi Chemical Corporation), the amine-modified block acrylic polymer as a dispersant, and the solvent AF4 were premixed in the ratio shown in Table 14 to prepare a liquid preparation. The thus obtained liquid preparation was dispersed thoroughly using a beads mill to complete preparation of a pigment dispersion.

(Step (4): Preparation of Ink)

Using the ratio shown in Table 14, a four-neck flask was charged with the aforementioned pigment dispersion and a portion of the AF4 (40% by mass), and the temperature was increased to 110° C. Subsequently, a dibutyltin dilaurate catalyst was added, and a mixture containing the polyvalent isocyanate compound Duranate TSA-100 (hexamethylene diisocyanate (trimer isocyanurate structure), NCO: 20.6% by mass, manufactured by Asahi Kasei Chemicals Corporation) and the remaining AF4 was then added dropwise to the flask over a period of 30 minutes. Following completion of the dropwise addition, the reaction was allowed to proceed for 3 hours. The dibutyltin dilaurate catalyst was added in an amount of 0.01% by mass relative to the 100% by mass of the components shown in Table 14.

Examples 18 to 20

The inks of Examples 18 to 20 were prepared in the same manner as that described above for Example 1, using the compositions shown in Table 14. In Example 20, Duranate AE700-100 (hexamethylene diisocyanate (adduct structure), NCO: 12% by mass, manufactured by Asahi Kasei Chemicals Corporation) was used as the polyvalent isocyanate compound.

The amine-modified block acrylic polymers used in Examples 18 to 20 were prepared by using the compositions shown in Table 10 to prepare the block acrylic polymers, and then subsequently using these polymers to prepare the amine-modified block acrylic polymers in accordance with the compositions shown in Table 11.

The block acrylic polymers PA2-B1 and PA2-B2 both use AF4 as the solvent, and therefore during the synthesis of the amine-modified block acrylic polymers AmPA2-B1 and AmPA2-B2, the solvent was not removed from the block acrylic polymers PA2-B1 and PA2-B2, and the polymers were simply used in the solution state having a solid fraction of 40% by mass.

The remainder of the preparation was conducted in the same manner as Example 1.

Comparative Example 9

In the ink of Comparative Example 9, a random acrylic polymer PAB2 was used as the dispersant, and a diamine (Duomeen T, compound name: N-(tallow alkyl)-1,3-diaminopropane, manufactured by Lion Akzo Co., Ltd.) was used instead of a polyvalent isocyanate compound. The remainder of the preparation was performed in accordance with the composition shown in Table 14, using the same method as that described above for Example 17.

The random acrylic polymer PAB2 was prepared by charging a round-bottom flask with all of the components shown in Table 12, thoroughly deaerating the flask, replacing the atmosphere inside the flask with an inert gas (argon), and then stirring the contents of the flask under heat at 65° C. for 24 hours. The thus obtained random polymer PAB2 had a solid fraction (non-volatile fraction) of 40% by mass.

Comparative Example 10

In the ink of Comparative Example 10, the amine-modified block acrylic polymer AmPA2-B1 was used as a dispersant, but no polyvalent isocyanate compound was used. The remainder of the preparation was performed in accordance with the composition shown in Table 14, using the same method as that described above for Example 17.

Examples 21 to 24

Ink formulations of Examples 21 to 24, and the results of evaluating those inks are shown in Table 15.

In Example 21, the amine-modified block acrylic polymer AmPA1-B1 was used as a dispersant, and AF4 was used as the solvent.

In Example 22, the amine-modified block acrylic polymer AmPA1-B1 was used as a dispersant, and AF4 and isooctyl palmitate (IOP) were used as solvents.

In Example 23, an amine-modified random acrylic polymer AmPAB1 was used as a dispersant, and AF4 was used as the solvent.

In Example 24, the amine-modified random acrylic polymer AmPAB1 was used as a dispersant, and AF4 and isooctyl palmitate (TOP) were used as solvents.

The remainder of each preparation was performed in accordance with the respective composition shown in Table 15, using the same method as that described above for Example 1.

The amine-modified random acrylic polymer AmPAB1 used in Examples 22 and 24 was prepared in accordance with the composition shown in Table 12 by first synthesizing the random acrylic polymer PAB1 using the same method as that described above for Example 1, and subsequently using the composition shown in Table 13 to synthesize the amine-modified random acrylic polymer AmPAB1 using the same method as that described for Example 1.

The random acrylic polymer PAB1 was prepared using ethyl acetate as a solvent, but in the synthesis of the amine-modified random acrylic polymer AmPAB1, this solvent was removed from the solution of the random acrylic polymer PAB1, and the polymer was then diluted with AF4 to prepare a solution having a solid fraction concentration of 40% by mass.

In Table 14 and Table 15, the mass-average molecular weight of the dispersant refers to the mass-average molecular weight of the polymer used as a dispersant. In the case of an amine-modified (block) acrylic polymer, the mass-average molecular weight is the same as that of the (block) acrylic polymer.

TABLE 10

(First stage: acrylic polymers PA: composition and physical properties)

| | | Units: g Polymer No. | |
|---|---|---|---|
| | | PA1 | PA2 |
| Monomer A | Dodecyl methacrylate | 88.49 | — |
| | Behenyl methacrylate | — | 137.04 |
| RAFT agent | 2-cyano-2-propyl dodecyl trithiocarbonate | 2.00 | 2.00 |
| Polymerization initiator | AIBN | 0.29 | 0.29 |
| Polymerization solvent | Ethyl acetate | 136.15 | — |
| | AF4 | — | 209.00 |
| Total (g) | | 226.93 | 348.33 |

TABLE 10-continued

| | | | |
|---|---|---|---|
| Solid fraction (% by mass) | | 40 | 40 |
| Mass-average molecular weight | | 15,000 | 20,000 |

(Second stage: block acrylic polymers PA-(A)B: composition and physical properties)

| | | Units: g Polymer No. | | | |
|---|---|---|---|---|---|
| | | PA1-B1 | PA1-B2 | PA2-B1 | PA2-B2 |
| Monomer composition | | A-AB | A-AB | A-AB | A-B |
| Acrylic polymer PA | PA1 (solid fraction: 40% by mass) | 44.98 | 44.98 | — | — |
| | PA2 (solid fraction: 40% by mass) | — | — | 69.27 | 69.27 |
| Monomer A | Dodecyl methacrylate | 14.75 | 8.76 | — | — |
| | Behenyl methacrylate | — | — | 22.84 | — |
| Monomer B | Glycidyl methacrylate | 8.24 | 4.89 | 8.24 | 8.24 |
| Polymerization initiator | AIBN | 0.06 | 0.06 | 0.06 | 0.06 |
| Polymerization solvent | Ethyl acetate | 34.6 | 24.7 | — | — |
| | AF4 | — | — | 46.5 | 12.5 |
| Total (g) | | 102.63 | 83.39 | 146.91 | 90.07 |
| Solid fraction (% by mass) | | 40 | 40 | 40 | 40 |
| Mass-average molecular weight | | 35,000 | 30,000 | 50,100 | 23,000 |
| Monomer composition | Monomer A (mol) | 0.13 | 0.13 | 0.13 | 0.07 |
| | Monomer B (mol) | 0.06 | 0.01 | 0.06 | 0.06 |
| Molar ratio of monomer A:monomer B | | 68:32 | 75:25 | 68:32 | 54:46 |
| Molar ratio of block A: block B | | 37.5:62.5 | 50:50 | 40:60 | 60:40 |
| Monomer A within block A (mol %) | | 100.00 | 100.00 | 100.00 | 100.00 |
| Monomer B within block B (mol %) | | 50 | 50 | 46.3 | 100 |

TABLE 11

Amine-modified block acrylic polymers: composition and physical properties

| | | Units: g Polymer No. | | | |
|---|---|---|---|---|---|
| | | AmPA1-B1 | AmPA1-B2 | AmPA2-B1 | AmPA2-B2 |
| Block acrylic polymer | PA1-B1 (solid fraction: 100%) | 20.00 | — | — | — |
| | PA1-B2 (solid fraction: 100%) | — | 20.00 | — | — |
| | PA2-B1 (solid fraction: 40%) | — | — | 50.00 | — |
| | PA2-B2 (solid fraction: 40%) | — | — | — | 50.00 |
| Diethanolamine | | 2.90 | 0.85 | 2.02 | 3.30 |
| AF4 | | 35.00 | 31.00 | 23.00 | 25.00 |
| Total (g) | | 57.90 | 51.69 | 75.02 | 78.30 |
| Solid fraction (%) | | 40.00 | 40.00 | 40.00 | 40.00 |
| Molar ratio (equivalents) of diethanolamine relative to monomer B | | 0.98 | 0.98 | 0.98 | 0.98 |

TABLE 12

Random acrylic polymers: composition and physical properties

| | | Units: g Polymer No. | |
|---|---|---|---|
| | | PAB1 | PAB2 |
| Monomer A | Dodecyl methacrylate | 32.45 | — |
| | Behenyl methacrylate | — | 27.01 |
| Monomer B | Glycidyl methacrylate | 8.24 | 8.24 |
| Polymerization initiator | AIBN | 0.20 | 0.30 |
| Polymerization solvent | Ethyl acetate | 61.83 | — |
| | AF4 | — | 54.3 |
| Total (g) | | 102.72 | 89.85 |
| Solid fraction (% by mass) | | 40 | 40 |

TABLE 12-continued

Random acrylic polymers: composition and physical properties

Units: g
Polymer No.

|  |  | PAB1 | PAB2 |
|---|---|---|---|
| Mass-average molecular weight |  | 35,000 | 23,000 |
| Monomer | Monomer A (mol) | 0.13 | 0.07 |
| composition | Monomer B (mol) | 0.06 | 0.06 |
| Molar ratio of monomer A:monomer B |  | 68:32 | 54:46 |

TABLE 13

Amine-modified random acrylic polymer: composition and physical properties

Units: g
Polymer No.

| | AmPAB1 |
|---|---|
| Random acrylic polymer PAB1 (solid fraction: 100%) | 20.00 |
| Diethanolamine | 2.90 |
| AF4 | 35.00 |
| Total (g) | 57.90 |
| Solid fraction (% by mass) | 40 |
| Molar ratio (equivalents) of diethanolamine relative to monomer B | 0.98 |

TABLE 14

Examples and Comparative Examples: ink formulations and results of evaluation

| Units: % by mass | | | Example 17 | Example 18 | Example 19 | Example 20 | Comparative Example 9 | Comparative Example 10 |
|---|---|---|---|---|---|---|---|---|
| Pigment dispersion | Pigment | MA11 | 10.00 | 10.00 | 10.00 | 10.00 | 10.00 | 10.00 |
| | Dispersant (polymer No.) | AmPA1-B1 | 15.00 | — | — | — | — | — |
| | | AmPA1-B2 | — | 15.00 | — | — | — | — |
| | | AmPA2-B1 | — | — | 15.00 | — | — | 15.00 |
| | | AmPA2-B2 | — | — | — | 15.00 | — | — |
| | | PAB2 | — | — | — | — | 15.00 | — |
| | Solvent | AF4 | 25.00 | 25.00 | 25.00 | 25.00 | 25.00 | 25.00 |
| Polyvalent isocyanate compound | | Duranate TSA-100 | 2.55 | 0.75 | 2.55 | — | — | — |
| | | Duranate AE700-100 | — | — | — | 5.00 | — | — |
| Diatnine | | Duomeen T | — | — | — | — | 6.08 | — |
| Solvent | | AF4 | 47.45 | 49.25 | 47.45 | 45.00 | 43.92 | 50.00 |
| Total (% by mass) | | | 100.00 | 100.00 | 100.00 | 100.00 | 100.00 | 100.00 |
| Mass-average molecular weight of dispersant | | | 35,000 | 30,000 | 50,100 | 23,000 | 23,000 | 50,100 |
| Solid fraction of dispersant (% by mass) | | | 40 | 40 | 40 | 40 | 40 | 40 |
| Mass of dispersant (solid fraction) relative to a value of 1 for the pigment (mass ratio) | | | 0.6 | 0.6 | 0.6 | 0.6 | 0.6 | 0.6 |
| Molar ratio (equivalents) of diethanolamine relative to monomer B | | | 0.98 | 0.98 | 0.98 | 0.98 | 0.98 | 0.98 |
| Molar ratio (equivalents) of polyvalent isocyanate compound relative to diethanolamine | | | 1.00 | 1.00 | 1.00 | 1.00 | — | — |
| Proportion of polyvalent isocyanate compound within total polymer (% by mass) | | | 29.82 | 11.11 | 29.82 | 45.45 | 0 | 0 |
| Monomer A:monomer B | | | 68:32 | 75:25 | 68:32 | 54:46 | 54:46 | 68:32 |
| Molar ratio of block A:block B | | | 37.5:62.5 | 50:50 | 40:60 | 60:40 | — | 40:60 |
| Monomer A within block A (mol %) | | | 100 | 100 | 100 | 100 | 100 | 100 |
| Monomer B within block B (mol %) | | | 50 | 50 | 46.3 | 100 | — | 46.3 |
| Evaluation results | | Ink viscosity | AA | AA | A | B | C | AA |
| | | Storage stability | A | A | A | B | B | A |
| | | Fixability | AA | AA | A | A | C | C |
| | | Image density | A | A | A | A | B | B |
| | | Show-through | A | A | A | A | B | B |

TABLE 15

Examples: ink formulations and results of evaluation

| | | Units: % by mass | Example 21 | Example 22 | Example 23 | Example 24 |
|---|---|---|---|---|---|---|
| Pigment dispersion | Pigment | MA11 | 10.00 | 10.00 | 10.00 | 10.00 |
| | Dispersant | AmPA1-B1 | 15.00 | 15.00 | — | — |
| | | AmPAB1 | — | — | 15.00 | 15.00 |
| | Solvent | AF4 | 25.00 | 25.00 | 25.00 | 25.00 |
| Polyvalent isocyanate compound | | Duranate TSA-100 | 2.55 | 2.55 | 2.55 | 2.55 |
| | | Duranate AE700-100 | — | — | — | — |
| Solvent | | AF4 | 47.45 | 22.45 | 47.45 | 22.45 |
| | | IOP | — | 25.00 | — | 25.00 |
| Total (% by mass) | | | 100.00 | 100.00 | 100.00 | 100.00 |
| Mass-average molecular weight of dispersant | | | 35,000 | 35,000 | 23,000 | 23,000 |
| Solid fraction of dispersant (% by mass) | | | 40 | 40 | 40 | 40 |
| Mass of dispersant (solid fraction) relative to a value of 1 for the pigment (mass ratio) | | | 0.6 | 0.6 | 0.6 | 0.6 |
| Molar ratio (equivalents) of diethanolamine relative to monomer B | | | 0.98 | 0.98 | 0.98 | 0.98 |
| Molar ratio (equivalents) of polyvalent isocyanate compound relative to diethanolamine | | | 1.00 | 1.00 | 1.00 | 1.00 |
| Proportion of polyvalent isocyanate compound within total polymer (% by mass) | | | 29.82 | 29.82 | 29.82 | 29.82 |
| Monomer A:monomer B | | | 68:32 | 68:32 | 68:32 | 68:32 |
| Molar ratio of block A:block B | | | 37.5:62.5 | 37.5:62.5 | — | — |
| Monomer A within block A (mol %) | | | 100 | 100 | — | — |
| Monomer B within block B (mol %) | | | 50 | 50 | — | — |
| Evaluation results | | Ink viscosity | AA | AA | A | A |
| | | Storage stability | AA | AA | B | A |
| | | Fixability | AA | B | A | B |
| | | Image density | A | B | A | B |
| | | Show-through | A | B | A | B |

<Evaluations>

Using each of the inks described above, evaluations were performed of the ink viscosity, storage stability, fixability, image density and show-through. The evaluation methods and evaluation criteria used were the same as described above. The results of these evaluations are shown in each of the tables.

As shown in Table 14, the inks of Examples 17 to 20 each exhibited favorable levels of inky viscosity, storage stability, fixability, image density and show-through.

In Comparative Example 9, a dispersant prepared by crosslinking the random acrylic polymer PAB2 with a diamine was used, but satisfactory ink viscosity and fixability could not be obtained.

In Comparative Example 10, the same amine-modified block acrylic polymer AmPA2-B2 as that used in Example 9 was used, but the polymer was not crosslinked with an isocyanate compound, and satisfactory fixability could not be achieved.

As shown in Table 15, the inks of Examples 21 to 24 exhibited favorable results regardless of whether the solvent was composed of a non-polar solvent, or composed of a solvent mixture of a non-polar solvent and a higher fatty acid ester.

In Examples 21 and 22, a block polymer was used as a dispersant, and the levels of ink viscosity, storage stability and fixability were particularly superior.

It is to be noted that, besides those already mentioned above, many modifications and variations of the above embodiments may be made without departing from the novel and advantageous features of the present invention. Accordingly, all such modifications and variations are intended to be included within the scope of the appended claims.

The invention claimed is:

1. A non-aqueous pigment ink comprising:
a pigment complex including a pigment, a dispersant comprising a functional group having reactivity with a polyvalent isocyanate compound, and a polyvalent isocyanate compound, and
a non-aqueous solvent;
wherein the dispersant is a copolymer having:
a unit having an alkyl group of 12 or more carbon atoms, and
a unit having a functional group having reactivity with a polyvalent isocyanate compound, wherein
relative to a total of all units that constitute the copolymer, an amount of the unit having an alkyl group of 12 or more carbon atoms is from 30 to 80 mol %, and an amount of the unit having a functional group having reactivity with a polyvalent isocyanate compound is from 20 to 70 mol %.

2. The non-aqueous pigment ink according to claim 1, wherein the pigment complex further comprises a polyhydric alcohol compound.

3. The non-aqueous pigment ink according to claim 1, wherein the polyvalent isocyanate compound is a compound comprising an isocyanurate ring.

4. The non-aqueous pigment ink according to claim 3, wherein the pigment complex further comprises a polyhydric alcohol compound.

5. A non-aqueous pigment ink comprising:
a pigment complex including a pigment, a dispersant comprising a functional group having reactivity with a polyvalent isocyanate compound, and a polyvalent isocyanate compound, and a non-aqueous solvent;

wherein the dispersant is a block copolymer having:

a first block comprising a unit having an alkyl group of 12 or more carbon atoms, and a second block comprising a unit having a functional group having reactivity with a polyvalent isocyanate compound, wherein relative to a total of all units that constitute the first block, an amount of the unit having an alkyl group of 12 or more carbon atoms is at least 50 mol %, and an amount of the unit having a functional group having reactivity with a polyvalent isocyanate compound is less than 10 mol %, and relative to a total of all units that constitute the second block, an amount of the unit having a functional group having reactivity with a polyvalent isocyanate compound is at least 10 mol %.

6. The non-aqueous pigment ink according to claim 5, wherein a molar ratio between the first block and the second block is from 20:80 to 90:10.

7. The non-aqueous pigment ink according to claim 5, wherein the polyvalent isocyanate compound is a compound comprising an isocyanurate ring.

8. A non-aqueous pigment ink comprising:

a pigment complex including a pigment, a dispersant comprising a functional group having reactivity with a polyvalent isocyanate compound, and a polyvalent isocyanate compound, and a non-aqueous solvent;

wherein the dispersant is a copolymer of a monomer mixture comprising an alkyl (meth)acrylate (A) having an alkyl group of 12 or more carbon atoms, and a reactive (meth)acrylate (B) having a functional group that can react with an amino group, and the copolymer has a functional group having reactivity with a polyvalent isocyanate compound that has been introduced by a reaction between the functional group that can react with an amino group and an aminoalcohol.

9. The non-aqueous pigment ink according to claim 8, wherein the pigment complex further comprises a polyhydric alcohol compound.

10. The non-aqueous pigment ink according to claim 8, wherein the reactive (meth)acrylate (B) has a glycidyl group.

11. The non-aqueous pigment ink according to claim 8, wherein the polyvalent isocyanate compound is a compound comprising an isocyanurate ring.

12. The non-aqueous pigment ink according to claim 8, wherein the monomer mixture further comprises a (meth)acrylate (C) having a β-diketone group or a β-keto ester group.

13. The non-aqueous pigment ink according to claim 12, wherein the reactive (meth)acrylate (B) has a glycidyl group.

14. The non-aqueous pigment ink according to claim 13, wherein the polyvalent isocyanate compound is a compound comprising an isocyanurate ring, and the pigment complex further comprises a polyhydric alcohol compound.

15. A non-aqueous pigment ink comprising:

a pigment complex including a pigment, a dispersant comprising a functional group having reactivity with a polyvalent isocyanate compound, and a polyvalent isocyanate compound, and a non-aqueous solvent;

wherein the dispersant is a block copolymer having a block formed from a monomer mixture comprising an alkyl (meth)acrylate (A) having an alkyl group of 12 or more carbon atoms, and a block formed from a monomer mixture comprising a reactive (meth)acrylate (B) having a functional group that can react with an amino group, and the block copolymer has a functional group having reactivity with a polyvalent isocyanate compound that has been introduced by a reaction between the functional group that can react with an amino group and an aminoalcohol.

16. The non-aqueous pigment ink according to claim 15, wherein the reactive (meth)acrylate (B) has a glycidyl group.

17. The non-aqueous pigment ink according to claim 15, wherein the polyvalent isocyanate compound is a compound comprising an isocyanurate ring.

* * * * *